United States Patent
Sugimoto et al.

(10) Patent No.: US 9,660,871 B2
(45) Date of Patent: May 23, 2017

(54) ELECTRONIC DEVICE AND ELECTRONIC DEVICE CONTROL PROGRAM

(71) Applicants: Yusuke Sugimoto, Kanagawa (JP); Yohei Yamamoto, Tokyo (JP)

(72) Inventors: Yusuke Sugimoto, Kanagawa (JP); Yohei Yamamoto, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 234 days.

(21) Appl. No.: 14/366,519

(22) PCT Filed: Dec. 17, 2012

(86) PCT No.: PCT/JP2012/083179
§ 371 (c)(1),
(2) Date: Jun. 18, 2014

(87) PCT Pub. No.: WO2013/094715
PCT Pub. Date: Jun. 27, 2013

(65) Prior Publication Data
US 2015/0128054 A1    May 7, 2015

(30) Foreign Application Priority Data
Dec. 22, 2011  (JP) ................. 2011-281948

(51) Int. Cl.
*G06F 9/00*   (2006.01)
*H04L 12/24*  (2006.01)
(Continued)

(52) U.S. Cl.
CPC ............ *H04L 41/22* (2013.01); *G06F 3/0484* (2013.01); *G06F 9/44505* (2013.01)

(58) Field of Classification Search
CPC ....... H04L 41/22; H04L 12/24; G06F 3/0484; G06F 9/44505
(Continued)

(56) References Cited

U.S. PATENT DOCUMENTS 5,991,875 A   11/1999 Paul
6,434,696 B1   8/2002 Kang
(Continued)

FOREIGN PATENT DOCUMENTS

EP    0 369 934 A2   5/1990
EP    0589068 A1    3/1994
(Continued)

OTHER PUBLICATIONS

Search Report and Written Opinion issued Jun. 4, 2015 in Singaporean Patent Application No. 11201402637P.
(Continued)

*Primary Examiner* — Kim Huynh
*Assistant Examiner* — Aaron J Browne
(74) *Attorney, Agent, or Firm* — Oblon, McClelland, Maier & Neustadt, L.L.P.

(57) ABSTRACT

An electronic device that requires setup of plural setting items upon initial startup operations includes a storage unit that stores designated setting information and setting status information indicating whether the setting items have been set up, which designated setting information and setting status information are stored and updated each time the setup of one of the setting items is completed; and a startup processing unit that refers to the storage unit upon performing startup operations to determine whether at least one of the setting items has been set up and starts setup operations for the setting items that have not yet been set up.

6 Claims, 23 Drawing Sheets

| SETTING STATUS | 0 | 1 | 2 | 3 | 4 |
|---|---|---|---|---|---|
| LANGUAGE SETTING | NO | YES | YES | – | YES/– |
| FORMAT/TIME ZONE SETTING | NO | NO | YES | – | YES/– |
| NETWORK SETTING | NO | NO | NO | NO | YES |

(51) Int. Cl.
  *G06F 9/445* (2006.01)
  *G06F 3/0484* (2013.01)

(58) Field of Classification Search
  USPC .................................................... 713/2
  See application file for complete search history.

(56) References Cited

U.S. PATENT DOCUMENTS

| | | |
|---|---|---|
| 6,618,813 B1 | 9/2003 | Hsu et al. |
| 7,363,485 B1 | 4/2008 | Rao |
| 2008/0126957 A1* | 5/2008 | Tysowski ............ G06F 9/44505 715/764 |
| 2008/0221713 A1* | 9/2008 | Sadahira ............ G05D 23/1905 700/81 |
| 2009/0083374 A1* | 3/2009 | Saint Clair ............ G05B 15/00 709/203 |
| 2009/0300108 A1* | 12/2009 | Kohno ................ H04L 65/4092 709/203 |
| 2010/0042826 A1 | 2/2010 | Bull et al. |
| 2011/0102832 A1 | 5/2011 | Iwashita et al. |
| 2013/0067133 A1* | 3/2013 | Mansell ............ G06F 11/3636 710/267 |

FOREIGN PATENT DOCUMENTS

| | | |
|---|---|---|
| JP | 2001-202090 | 7/2001 |
| JP | 3299003 | 7/2002 |
| JP | 2005-2879 A | 1/2005 |
| JP | 2009-289182 | 12/2009 |
| JP | 2010-255922 | 11/2010 |
| JP | 2011-098483 | 5/2011 |
| JP | 2011-192036 | 9/2011 |
| KR | 10-2008-0015201 A | 2/2008 |
| WO | WO 2005/080884 A1 | 9/2005 |
| WO | WO 2008/118594 A1 | 10/2008 |

OTHER PUBLICATIONS

Japanese Office Action issued Mar. 22, 2016 in Patent Application No. 2011-281948.
Office Action issued Apr. 2, 2015 in Australian Patent Application No. 2012354649.
Extended European Search Report issued Mar. 31, 2015 in Patent Application No. 12859355.5.
International Search Report Issued on Feb. 12, 2013 in PCT/JP2012/083179 filed on Dec. 17, 2012.
Office Action issued Aug. 11, 2015 in Japanese Patent Application No. 2011-281948.

\* cited by examiner

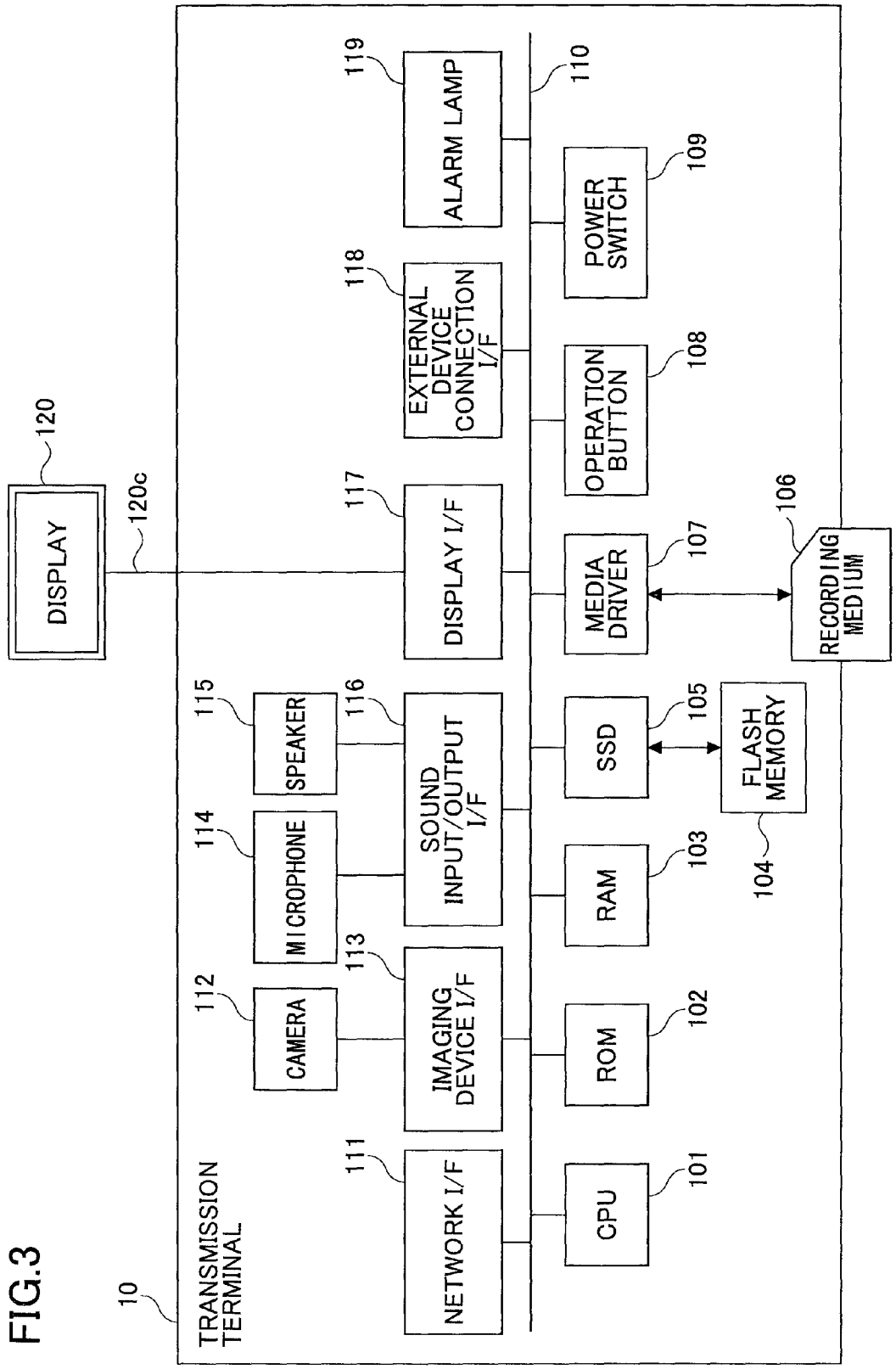

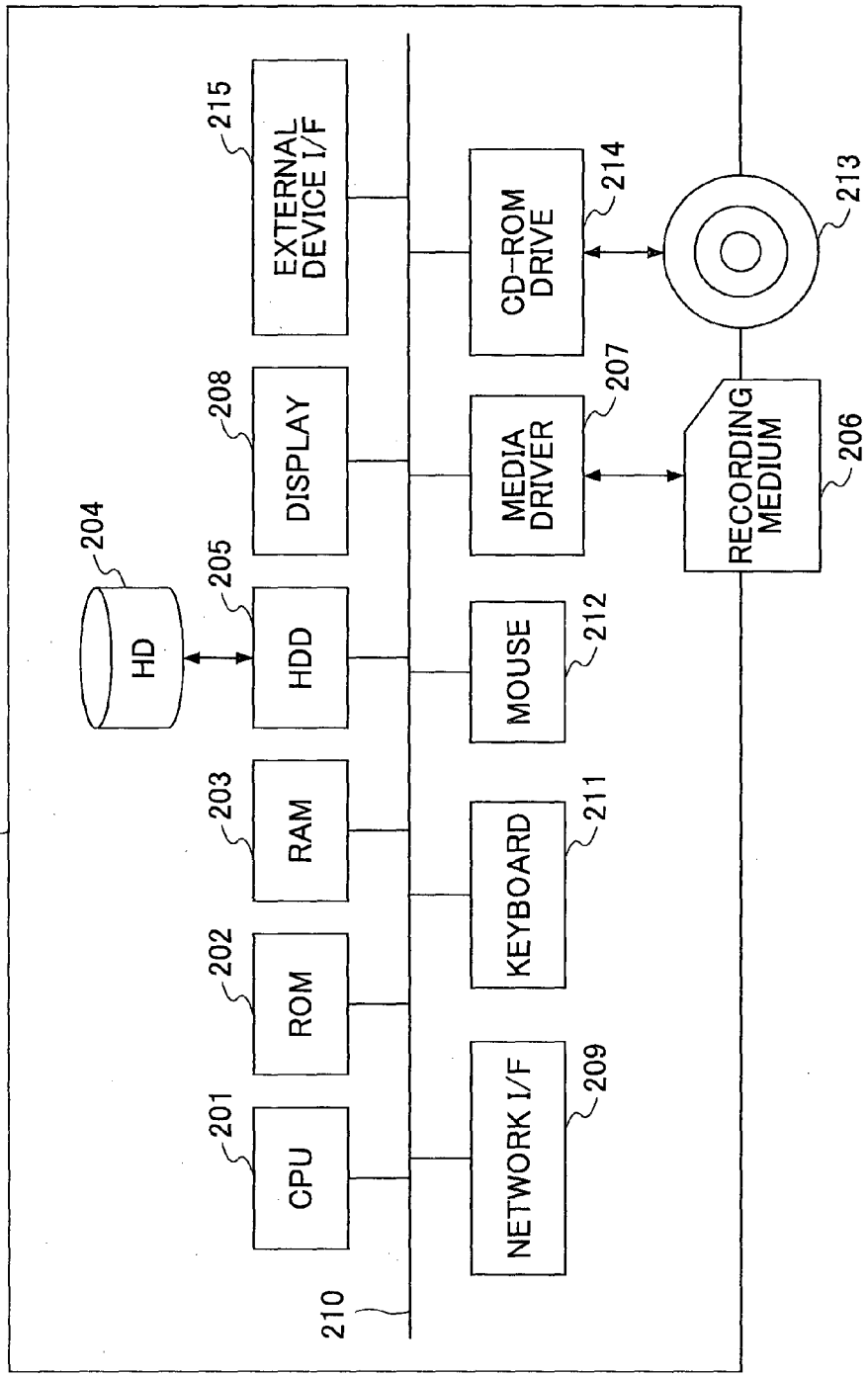

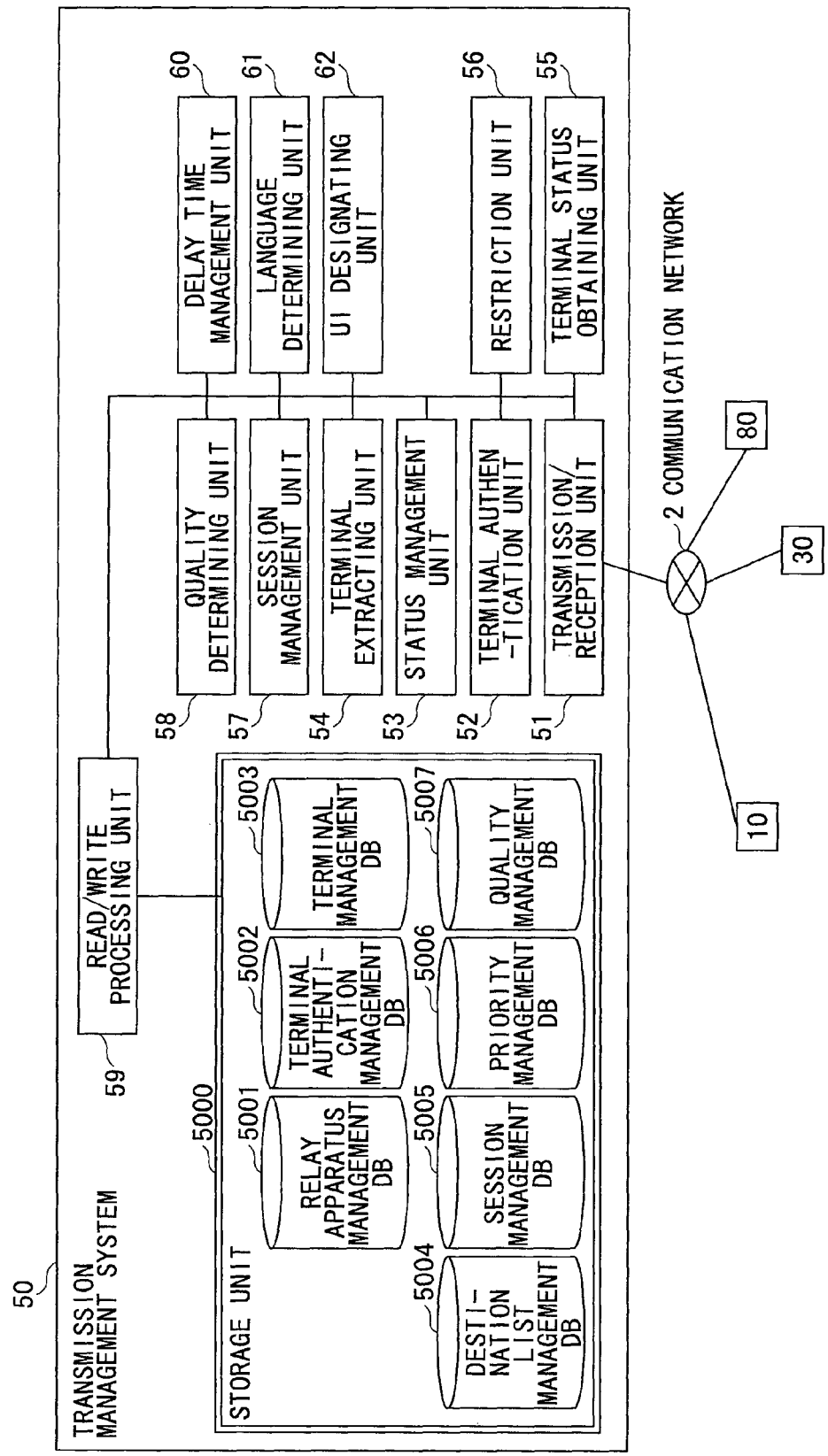

FIG.6

| SETTING STATUS | 0 | 1 | 2 | 3 | 4 |
|---|---|---|---|---|---|
| LANGUAGE SETTING | NO | YES | YES | – | YES/– |
| FORMAT/TIME ZONE SETTING | NO | NO | YES | – | YES/– |
| NETWORK SETTING | NO | NO | NO | NO | YES |

FIG.8

QUALITY CHANGE MANAGEMENT TABLE

| TRANSMISSION DESTINATION IP ADDRESS | IMAGE QUALITY OF IMAGE DATA TO BE TRANSMITTED |
|---|---|
| 1.3.2.4 | HIGH QUALITY |
| 1.3.1.3 | LOW QUALITY |
| 1.3.4.3 | MEDIUM QUALITY |
| ... | ... |

FIG.9

RELAY APPARATUS MANAGEMENT TABLE

| RELAY APPARATUS ID | OPERATION STATUS | RECEIVED DATE/TIME | RELAY APPARATUS IP ADDRESS | MAXIMUM DATA TRANSMISSION SPEED (Mbps) |
|---|---|---|---|---|
| 111a | ONLINE | 2009.11.10.13:00 | 1.2.1.2 | 100 |
| 111b | ONLINE | 2009.11.10.13:10 | 1.2.2.2 | 1000 |
| 111c | OFFLINE | 2009.11.10.13:20 | 1.3.1.2 | 100 |
| 111d | ONLINE | 2009.11.10.13:30 | 1.3.2.2 | 10 |

FIG.10

TERMINAL AUTHENTICATION
MANAGEMENT TABLE

| TERMINAL ID | PASSWORD |
|---|---|
| 01aa | aaaa |
| 01ab | abab |
| 01ba | baba |
| ... | ... |

FIG.11

TERMINAL MANAGEMENT TABLE

| TERMINAL ID | OPERATION STATUS | RECEIVED DATE/TIME | RELAY APPARATUS IP ADDRESS |
|---|---|---|---|
| 01aa | ONLINE | 2009.11.10.13:40 | 1.2.1.3 |
| 01ab | OFFLINE | 2009.11.09.12:00 | 1.2.1.4 |
| 01ba | ONLINE | 2009.11.10.13:45 | 1.2.2.3 |
| ... | ... | ... | ... |
| 01db | ONLINE | 2009.11.10.13:50 | 1.3.2.4 |

FIG.12

DESTINATION LIST MANAGEMENT TABLE

| REQUESTING TERMINAL ID | DESTINATION TERMINAL ID |
|---|---|
| 01aa | 01ab,01ba,01db |
| 01ab | 01aa,01ba,01ca |
| 01ba | 01aa,01ab,01cb,01da |
| ... | ... |
| 01db | 01aa,01ab,01da |

FIG.13

SESSION MANAGEMENT TABLE

| SELECTION SESSION ID | RELAY APPARATUS ID | REQUESTING TERMINAL ID | DESTINATION TERMINAL ID | DELAY TIME (ms) | DELAY INFORMATION RECEIVED DATE/TIME |
|---|---|---|---|---|---|
| se1 | 111a | 01aa | 01db | 200 | 2009.11.10.14:00 |
| se2 | 111b | 01ba | 01ca | 50 | 2009.11.10.14:10 |
| se3 | 111d | 01bb | 01da | 400 | 2009.11.10.14:20 |
| ... | ... | ... | ... | ... | ... |

FIG.14

ADDRESS PRIORITY MANAGEMENT TABLE

| DOT ADDRESS CONFORMITY | ADDRESS PRIORITY |
|---|---|
| SAME. SAME. SAME. DIF | 5 |
| SAME. SAME. DIF. - | 3 |
| SAME. DIF. -. - | 1 |
| DIF. -. -. - | 0 |

FIG.15

TRANSMISSION SPEED PRIORITY MANAGEMENT TABLE

| MAXIMUM DATA TRANSMISSION SPEED AT RELAY APPARATUS (Mbps) | TRANSMISSION SPEED PRIORITY |
|---|---|
| 1000 ~ | 5 |
| 100 ~ 1000 | 3 |
| 10 ~ 100 | 1 |
| ~ 10 | 0 |

FIG.16

QUALITY MANAGEMENT TABLE

| DELAY TIME (ms) | IMAGE QUALITY OF IMAGE DATA |
|---|---|
| 0 ~ 100 | HIGH QUALITY |
| 100 ~ 300 | MEDIUM QUALITY |
| 300 ~ 500 | LOW QUALITY |
| 500 ~ | (STOP) |

FIG.17

| LANGUAGE INFORMATION | UI RESOURCE INFORMATION |
|---|---|
| ja | http://www.domain.co.jp/ja/index.html |
| en | http://www.domain.co.jp/en/index.html |

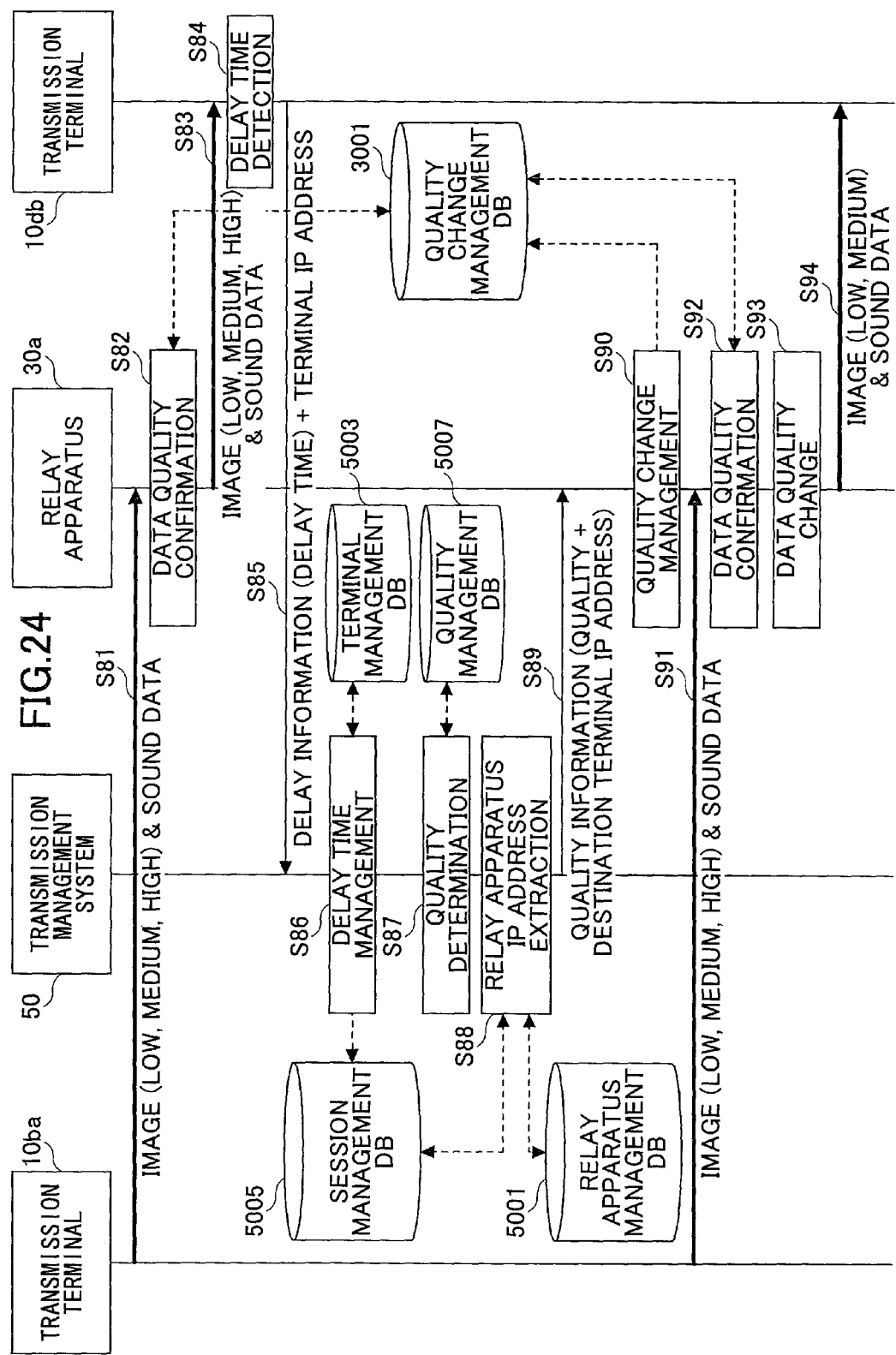

ELECTRONIC DEVICE AND ELECTRONIC DEVICE CONTROL PROGRAM

TECHNICAL FIELD

The present invention relates generally to an electronic device and an electronic device control program, and particularly to a transmission terminal that transmits and receives data to be shared with another transmission terminal and outputs image data to a display device.

BACKGROUND ART

A remote conference system for holding a remote conference between parties located at remote locations via a communication network such as the Internet is becoming widespread.

In such a remote conference system, a remote conference similar to an actual meeting may be held between two or more parties situated at remote locations by having a transmission terminal (terminal apparatus) located at a conference room of one party capture an image of the conference room and pick up sound such as voices generated at the conference room, convert the acquired data into digital data, and transmit the digital data to a transmission terminal located at a conference room of the other party. In turn, the transmission terminal of the other party receiving the digital data may output the image data to a display (display device) located at the conference room of the other party and output the sound data to a speaker located at the conference room of the other party.

An electronic device embodying such a transmission terminal may be configured to display a menu (UI: User Interface) on the display and execute operations based on commands input via the menu. In a case where the electronic device is used in different regions using different languages, the electronic device is desirably configured to display the menu in the language used in the corresponding region.

Accordingly, the electronic device has default language setting values set up beforehand according to its delivery destination and also includes a language selection menu for enabling a user to change the language setting.

However, when the user is unable to read the default language, the user may have trouble finding the language selection menu.

Accordingly, Japanese Patent No. 3299003 discloses an electronic device that includes a language storage area and is configured to display the language selection menu when language information indicating the language to be used is not stored in the language storage area.

However, the language setting menu of the electronic device, particularly the language setting menu provided at initial startup operations of the electronic device, typically requires the user to set up other setting items such as the format, time zone, and network information in addition to the language setting. When the user turns off the power of the electronic device after selecting a language but before setting up the other setting items, the user has to start the setup operations all over again including the setup of the language setting when the electronic device is started another time.

DISCLOSURE OF THE INVENTION

Problems to be Solved by the Invention

It is a general object of at least one embodiment of the present invention to provide an electronic device that substantially obviates one or more problems caused by the limitations and disadvantages of the related art.

It is one object of at least one embodiment of the present invention to improve usability of an electronic device by relieving a user of the burden of having to set up a setting item the user has set up previously even if the power of the electronic device was turned off before completion of the previous setup operations.

Means for Solving the Problems

In one embodiment of the present invention, an electronic device that requires setup of plural setting items upon initial startup operations includes a storage unit that stores designated setting information and setting status information indicating whether the setting items have been set up which designated setting information and setting status information are stored and updated each time the setup of one of the setting items is completed, and a startup processing unit that refers to the storage unit upon performing startup operations to determine whether at least one of the setting items has been set up and starts setup operations for the setting items that have not yet been set up.

Effects of the Present Invention

According to an aspect of the present invention, usability of an electronic device may be improved by relieving a user of the burden of having to set up a setting item the user has set up previously even if the power of the electronic device was turned off before completion of the previous setup operations.

BRIEF DESCRIPTION OF THE DRAWINGS

FIG. 3 is a block diagram showing a hardware configuration of the transmission terminal;

FIG. 4 is a block diagram showing a hardware configuration of a transmission management system according to an embodiment of the present invention;

FIGS. 5A-5B are a block diagrams showing functional configurations of the transmission system;

FIG. 6 is a table illustrating an exemplary set of setting status information;

FIG. 8 shows an exemplary quality change management table;

FIG. 9 shows an exemplary relay apparatus management table;

FIG. 10 shows an exemplary terminal authentication management table;

FIG. 11 shows an exemplary terminal management table;

FIG. 12 shows an exemplary destination list management table;

FIG. 13 shows an exemplary session management table;

FIG. 14 shows an exemplary address priority management table;

FIG. 15 shows an exemplary transmission speed priority management table;

FIG. 16 shows an exemplary quality management table;

FIG. 17 shows an exemplary language table;

FIG. 24 is a sequence chart showing exemplary process steps for exchanging image data and sound data between transmission terminals.

DESCRIPTION OF THE REFERENCE NUMERALS

1: TRANSMISSION SYSTEM
10: TRANSMISSION TERMINAL
11: TRANSMISSION/RECEPTION UNIT
12: OPERATION INPUT ACCEPTING UNIT
13: LOGIN REQUEST UNIT
14a: IMAGING UNIT
14b: IMAGE DISPLAY CONTROL UNIT
15a: SOUND INPUT UNIT
15b: SOUND OUTPUT UNIT
16: SELECTION PROCESSING UNIT
17: DELAY DETECTING UNIT
19: READ/WRITE PROCESSING UNIT
101a: STARTUP PROCESSING UNIT
101b: SETTING UI UNIT
101c: LANGUAGE DESIGNATING UNIT
101d: UI OBTAINING UNIT
30: RELAY APPARATUS
31: TRANSMISSION/RECEPTION UNIT
32: STATUS DETECTING UNIT
33: DATA QUALITY CONFIRMING UNIT
34: QUALITY CHANGE MANAGEMENT UNIT
35: DATA QUALITY CHANGE UNIT
50: TRANSMISSION MANAGEMENT SYSTEM
51: TRANSMISSION/RECEPTION UNIT
52: TERMINAL AUTHENTICATION UNIT
53: STATUS MANAGEMENT UNIT
54: TERMINAL EXTRACTING UNIT
55: TERMINAL STATUS OBTAINING UNIT
56: RESTRICTION UNIT
57: SESSION MANAGEMENT UNIT
58: QUALITY DETERMINING UNIT
60: DELAY TIME MANAGEMENT UNIT
61: LANGUAGE DETERMINING UNIT
62: UI DESIGNATING UNIT
80: UI PROVIDING SYSTEM
81: TRANSMISSION/RECEPTION UNIT
82: UI INFORMATION
100: MAINTENANCE SYSTEM
120: DISPLAY
1000: STORAGE UNIT
3000: STORAGE UNIT
3001: QUALITY CHANGE MANAGEMENT DB
5000: STORAGE UNIT
5001: RELAY APPARATUS MANAGEMENT DB
5002: TERMINAL AUTHENTICATION MANAGEMENT DB
5003: TERMINAL MANAGEMENT DB
5004: DESTINATION LIST MANAGEMENT DB
5005: SESSION MANAGEMENT DB
5006: PRIORITY MANAGEMENT DB
5007: QUALITY MANAGEMENT DB

MODE FOR CARRYING OUT THE INVENTION

In the following, embodiments of the present invention are described with reference to the accompanying drawings.

[Overall Configuration]

Figure 1:
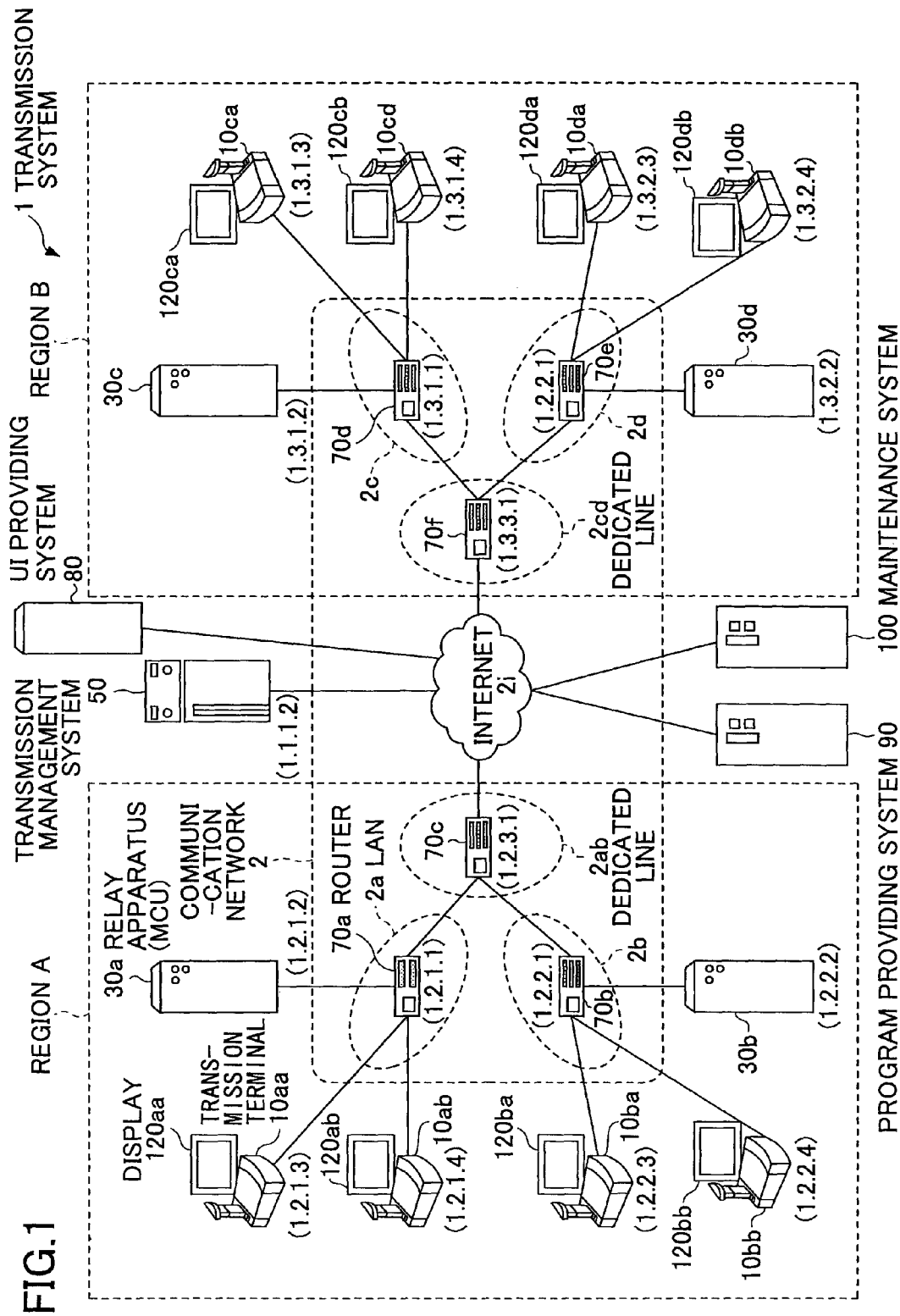
FIG. 1 is a diagram showing an overall configuration of a transmission system according to an embodiment of the present invention.

FIG. 1 is a diagram showing an overall configuration of a transmission system 1 according to an embodiment of the present invention.

The transmission system 1 may be a data providing system for transmitting content data from one transmission terminal to another transmission terminal via a transmission management system, or a communication system for establishing communication between plural transmission terminals via a transmission management system, for example. The communication system enables the exchange of information between plural communication terminals (transmission terminals) via a communication management system (transmission management system). Examples of the communication system include a television/video conference system, a teleconference system, an audio conferencing system, an audio teleconference system, or a PC (personal computer) screen sharing system.

In the following descriptions it is assumed that the transmission system 1 according to the present embodiment is a television/video conference system that includes a television/video conference management system as the communication management system (transmission management system) and a television/video conference terminal as the communication terminal (transmission terminal). However, the present invention is not limited to a television/video conference system and may include other types of communications systems and transmission systems as well.

The transmission system 1 shown in FIG. 1 includes plural transmission terminals 10aa, 10ab, 10ba, 10bb, 10ca, 10cb, 10da, 10db (also referred to as "transmission terminal 10" hereinafter); plural displays 120aa, 120ab, 120ba, 120bb, 120ca, 120cb, 120da, 120db for the transmission terminals (also referred to as "display 120" hereinafter); plural relay apparatuses 30a, 30b, 30c, 30d (also referred to as "relay apparatus 30" hereinafter); a transmission management system 50; plural routers 70a, 70b, . . . , 70f (also referred to as "router 70" hereinafter); a UI providing system 80; a program providing system 90; and a maintenance system 100.

The transmission terminal 10 exchanges image data and sound data with other transmission terminals 10. In the following descriptions, it is assumed that image data of a moving image is exchanged between the transmission terminals 10. However, the transmission terminals 10 may exchange image data of a still image or image data of both a still image and a moving image, for example. The relay apparatus 30 receives and transmits (relays) the image data and sound data to be exchanged between plural transmission terminals 10. The transmission management system 50 performs overall management of the transmission terminals 10 and the relay apparatuses 30.

The router 70 selects, the optimal transmission path for the image data and the sound data. The program providing system 90 includes a hard disk (HD) (not shown in FIG. 1) that stores various programs to be provided to the transmission terminal 10, the relay apparatus 30, and/or the transmission management system 50, for example. In one embodiment, the program providing unit 90 may store a transmission terminal program for realizing the various functions of the transmission terminal 10 and may be configured to transmit the transmission terminal program to the transmission terminal 10. The program providing unit 90 may also store a transmission management program for realizing the various functions of the transmission management system 50 and may be configured to transmit the transmission management program to the transmission management system 50.

The transmission terminal 10*aa*, the transmission terminal 10*ab*, the relay apparatus 30*a*, and the router 70*a* are connected to a LAN (local area network) 2*a* so that they may exchange data with each other via the LAN 2*a*. The transmission terminal 10*ba*, the transmission terminal 10*bb*, the relay apparatus 30*b*, and the router 70*b* are connected to a LAN (local area network) 2*b* so that they may exchange data with each, other via the LAN 2*b*. The LAN 2*a* and the LAN 2*b* are connected to each other by a dedicated line 2*ab* that includes the router 70*c* so that they may exchange data with each other via the dedicated line 2*ab*. The LANs 2*a*, 2*b* are established within a predetermined region A. For example, region A may correspond to Japan, the LAN 2*a* may be established at an office in Tokyo, and the LAN 2*b* may be established at an office in Osaka.

The transmission terminal 10*ca*, the transmission terminal 10*cb*, the relay apparatus 30*c*, and the router 70*d* are connected to a LAN 2*c* so that they may exchange data with each other via the LAN 2*c*. The transmission terminal 10*da*, the transmission terminal 10*db*, the relay apparatus 30*d*, and the router 70*e* are connected to a LAN 2*d* so that they may exchange data with each other via the LAN 2*d*. The LAN 2*c* and the LAN 2*d* are connected to each other by a dedicated line 2*cd* that includes the router 70*f* so that they may exchange data with each other via the dedicated line 2*cd*. The LANs 2*c*, 2*d* are established within a predetermined region B. For example, region B may correspond to the United States, the LAN 2*d* may be established at an office in New York, and the LAN 2*b* may be established at an office in Washington, D.C. The regions A and B are connected to the Internet 2*i* via the routers 70*c* and 70*f*, respectively, so that the transmission terminals 10 and the relay apparatuses 30 within the regions A and B may exchange data with each other via the routers 70*c*, 70*f* and the Internet 2*i*.

The transmission management system 50 and the program providing system 90 are connected to the transmission terminals 10 and the relay apparatuses 30 via the Internet 2*i* so that they may exchange data with each other. The transmission management system 50 and the program providing system 90 may be located at either region A or region B, or some other region.

In the example shown in FIG. 1, a communication network 2 is established by the LAN 2*a*, the LAN 2*b*, the dedicated line 2*ab*, the Internet 2*i*, the dedicated line 2*cd*, the LAN 2*c*, and the LAN 2*d*.

It is noted that the four-digit numbers at the bottom of the transmission terminals 10, the relay apparatuses 30, the transmission management system 50, and the routers 70 in FIG. 1 are simplified representations of IPv4 addresses (IP addresses). For example, the IP address of the transmission terminal 10*aa* is "1.2.1.3." It is noted that although IPv4 addresses are used in the present example, in other examples, IPv6 addresses may be used as the IP addresses.

[Hardware Configuration]

Figure 2:
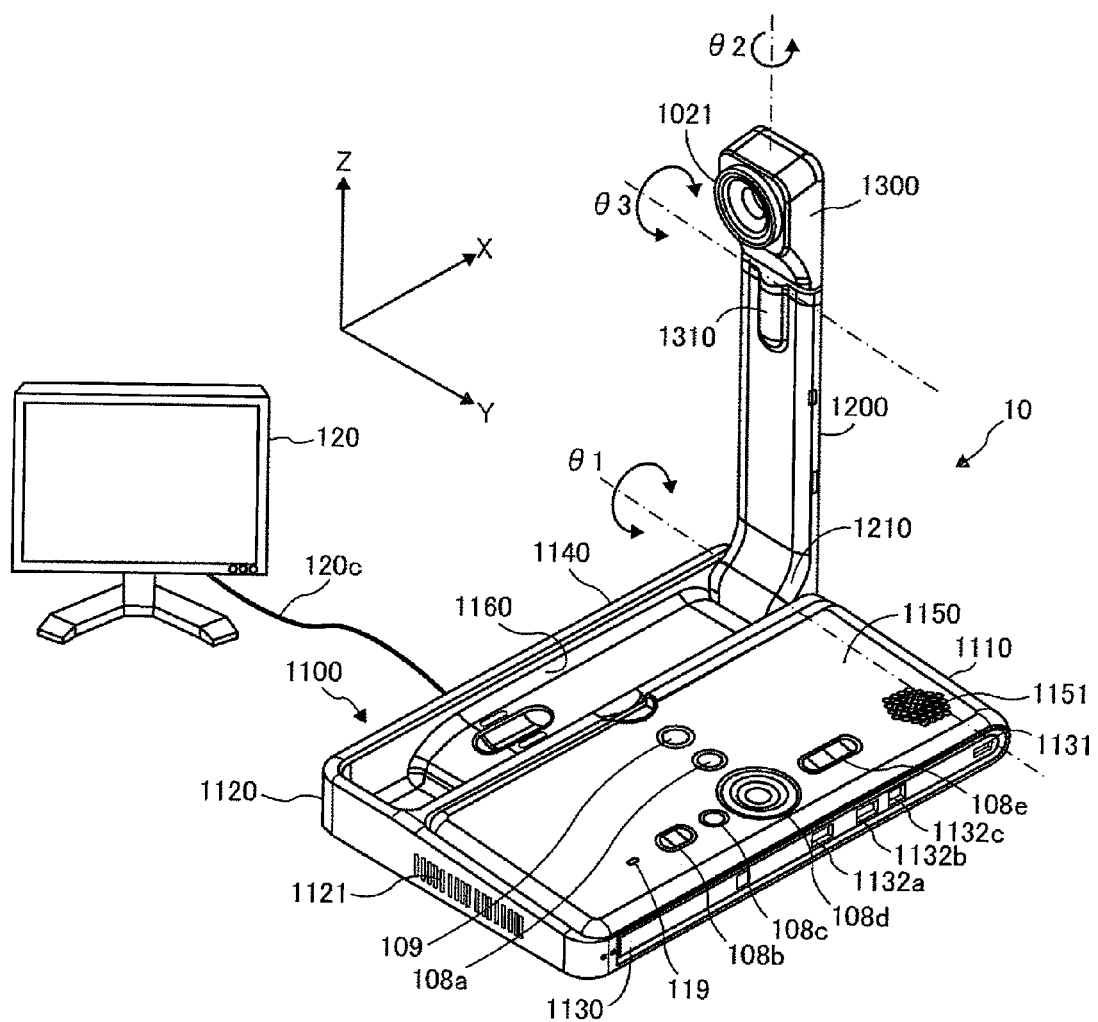
FIG. 2 is a perspective view of a transmission terminal according to an embodiment of the present invention.

FIG. 2 is a perspective view of the transmission terminal 10 according to the present embodiment. In FIG. 2, the longitudinal direction of the transmission terminal 10 is represented by an X-axis, the direction intersecting the X-axis at right angles on a horizontal plane is represented by a Y-axis, and the direction intersecting the X-axis and the Y-axis at right angles (vertical direction) is represented by a Z-axis.

As is shown in FIG. 2, the transmission terminal 10 includes a box 1100, an arm 1200, and a camera housing 1300. A front side wall 1110 of the box 1100 has an air inlet surface with plural air inlet holes (not shown). A rear side wall 1120 of the box 1100 has an exhaust face 1121 with plural exhaust holes. By driving a cooling fan (not shown) accommodated within the box 1100, air at the front side of the transmission terminal 10 may be introduced into the box 1100 via the air inlet face and emitted to the rear side via the exhaust face of the transmission terminal 10. A right side wall 1130 of the box 1100 has a sound pickup hole 1131 for enabling a built-in microphone 114 (described below with reference to FIG. 3) to pick up sound such as voices and noise, for example.

The box 1100 has an operations panel 1150 arranged at the side of the right side wall 1130. The operations panel 1150 includes plural operation buttons 108*a*-108*e* (also referred to as "operation button 108" hereinafter), a power switch 109, an alarm lamp 119, and a sound output face 1151 with plural sound output holes for outputting sound from a built-in speaker 115 (described below with reference to FIG. 3). Also, at a left side wall 1140 of the box 1100, a concave part is provided as an accommodating part 1160 for accommodating the arm 1200 and the camera housing 1300. The right side wall 1130 of the box 1100 has plural connection holes 1132*a*-1132*c* (also referred to as "connection hole 1132" hereinafter) for electrically connecting a cable to an external device connection interface (I/F) 118 (described below with reference to FIG. 3). The left side wall 1140 of the box 1100 has a connection hole (not shown) for electrically connecting a cable 120*c* of the display 120 to the external device connection I/F 118.

The arm 1200 is attached to the box 1100 via a torque hinge 1210, and the arm 1200 is configured to be rotatable around a 135-degree tilt angle range. In FIG. 2, the tilt angle θ1 of the arm 1200 is set at 90 degrees.

The camera housing 1300 includes a built-in camera 1021 that is configured to capture an image of a user, a document, or a room, for example. The camera housing 1300 also includes a torque hinge 1310. The camera housing 1300 is attached to the arm 1200 via the torque hinge 1310 and is configured to rotate horizontally around a pan angle range of ±180 degrees with respect to the position of the camera housing 1300 shown in FIG. 2 and rotate vertically around a tilt angle range of ±45 degrees with respect to the position shown in FIG. 2.

It is noted that the external appearance of the relay apparatus 30, the transmission management system 50, and the program providing system 90 may be identical to that of a conventional server computer so that their descriptions are omitted.

FIG. 3 is a block diagram showing a hardware configuration of the transmission terminal 10 according to the present embodiment. As is shown in FIG. 3, the transmission terminal 10 includes a CPU (Central Processing Unit) 101, a ROM (Read-Only Memory) 102 that stores various programs such as the transmission terminal program, a RAM (Random-Access Memory) 103 that is used as a working area for the CPU 101, a flash memory 104 that stores various types of data such as image data and sound data, a SSD (Solid State Drive) 105 that controls reading and writing of data on the flash memory 104 according to control operations by the CPU 101, a media driver 107 that controls reading and writing (recording) of data on a recording medium 106 such as a flash memory, an operations button 108 that is used to execute operations such as selecting a destination for the transmission terminal 10, a power switch 109 for switching on/off the power of the transmission terminal 10, a network I/F 111 for transmitting data via the communication network 2, a camera 112 including an imaging device such as a CCD (Charge-Coupled Device) that obtains image data of an imaging object according to control operations by the CPU 101, an imaging device I/F 113 that controls drive operations of the camera 112, a microphone 114 that inputs sound, a speaker 115 that outputs sound, a sound input/output I/F 116 that processes input/output operations of sound signals between the microphone 114 and the speaker 115, a display I/F 117 that transmits image data to the externally connected display 120 according to control operations by the CPU 101, the external device connection I/F 118 that transmits and receives data from an external device, an alarm lamp 119 that gives notification of abnormalities of various functions of the transmission terminal 10, and a bus line 110 including an address bus and a data bus for establishing electrical connection between the hardware components shown in FIG. 3.

The display 120 may be a display device made of liquid crystal or an organic EL (electroluminescence) material that displays an image of an imaging object or operation icons, for example. The display 120 is connected to the display I/F 117 via the cable 120c. The cable 120c may be an analog RGB (VGA) signal cable, a component video cable, a HDMI (High-Definition Multimedia Interface) signal cable, or a DVI (Digital Video Interactive) signal cable, for example.

The camera 112 includes a lens and a solid imaging device such as a CMOS (Complementary Metal Oxide Semiconductor) or a CCD (Charge-Coupled Device) that digitizes an image of an imaging object by converting light into an electrical charge.

The external device connection I/F 118 is configured to establish electrical connection with an external device such as an external camera, an external microphone, or an external speaker via a USB cable that is inserted into the connection hole 1132 of the box 1100 shown in FIG. 2, for example. In a case where an external camera is connected, drive operations of the external camera may be given priority over the built-in camera 112 according to control operations by the CPU 101. Similarly, in a case where an external microphone or an external speaker is connected, drive operations of the external microphone or the external speaker may be given priority over the built-in microphone 114 or the built-in speaker 115 according to control operations by the CPU 101.

The recording medium 106 is configured to be removable from the transmission terminal 10. The recording medium 106 may be any type of non-volatile memory that may be used for reading and writing data according to control operations by the CPU 101. Examples of the recording medium 106 include a flash memory and an EEPROM (Electrically Erasable and Programmable ROM). Also, the camera 112 may use any type of solid imaging device that captures and digitizes an image of an imaging object such as a CCD or a CMOS. The display 120 may use liquid crystal or an organic EL material to display an image of an imaging object or an operation icon, for example.

In one embodiment, the transmission terminal program may be provided or distributed in the form of a computer-installable or computer-executable file recorded on a computer-readable recording medium such as the recording medium 106, for example.

FIG. 4 is a block diagram showing a hardware configuration of the transmission management system 50 according to an embodiment of the present invention. The transmission management system 50 includes a CPU 201; a ROM 202 that stores various programs such as the transmission management program; a RAM 203 that is used as a working area for the CPU 201; a HD (Hard Disk) 204 that stores various types of data; a HDD (Hard Disk Drive) 205 that controls the reading and writing of data on the HD 204 according to control operations by the CPU 201; a media driver 207 that controls the reading and writing (recording) of data on a recording medium 206 such as a flash memory; a display 208 that displays various information items such as a cursor, a menu, a window, a character, and/or an image; a network I/F 209 that transmits data using the communication network 2; a keyboard 211 that includes plural keys for inputting characters, numeric values, and various commands; a mouse 212 that is used to select or execute various commands, select a processing object, or move a cursor, for example; a CD-ROM (Compact Disk Read-Only Memory) drive 214 that controls the reading and writing of data on a CD-ROM 213 as an example of a removable recording medium; an external device I/F 215 that exchanges information with an external device; and a bus line 210 such as an address bus and a data bus for establishing electrical connection between the hardware components of the transmission management system 50 shown in FIG. 4.

In one embodiment, the transmission management program may be provided or distributed in the form of a computer-installable or computer-executable file recorded on a computer-readable recording medium such as the recording medium 206 or the CD-ROM 213, for example.

The relay apparatus 30 may have a hardware configuration similar to that of the transmission management system 50 so that its descriptions are omitted. However, the ROM 202 of the relay apparatus 30 may store a relay apparatus program for controlling the operations of the relay apparatus 30 rather than the transmission management program. In one embodiment, the relay apparatus program may be provided or distributed in the form of a computer-installable or computer-executable file recorded on a computer-readable recording medium such as the recording medium 206 or the CD-ROM 213, for example.

The UI providing system 80 may have a hardware configuration similar to that of the transmission management system 50 so that its descriptions are omitted. However, the ROM 202 of the UI providing system 80 may store a UI providing system program for controlling the operations of the UI providing system 80 rather than the transmission management program. In one embodiment, the UI providing system program may be provided or distributed in the form of a computer-installable or computer-executable file recorded on a computer-readable recording medium such as the recording medium 206 or the CD-ROM 213, for example.

The program providing system 90 may have a hardware configuration similar to that of the transmission management system 50 so that its descriptions are omitted. However, the ROM 202 or the HD 204 of the program providing system 90 may store a program providing program for controlling the operations of the program providing system 90 rather than the transmission management program. In one embodiment, the program providing program may be provided or distributed in the form of a computer-installable or computer-executable file recorded on a computer-readable recording medium such as the recording medium 206 or the CD-ROM 213, for example.

The maintenance system 100 may have a hardware configuration similar to that of the transmission management system 50 so that its descriptions are omitted. The maintenance system 100 is a computer for maintaining, managing, or repairing at least one of the transmission terminal 10, the relay apparatus 30, the transmission management system 50, and/or the program providing system 90. For example, in a case where the maintenance system 100 is located in one country (language region) and the transmission terminal 10, the relay apparatus 30, the transmission management system 50, and/or the program providing system 90 are located in another country (language region), the maintenance system 100 may conduct maintenance operations on the transmission terminal 10, the relay apparatus 30, the transmission management system 50, and/or the program providing system 90 remotely via the communication network 2.

The maintenance system 100 may also perform maintenance operations without using the communication network 2 such as managing and tracking the model number, the manufacturing number, the sale destination, the maintenance log, and/or the failure history of the transmission terminal 10, the relay apparatus 30, the transmission management system 50, and/or the program providing system 90, for example.

It is noted that in the above example, the CD-ROM 213 is provided as a removable recording medium that may be used to store various programs. However, in other embodiments, other types of removable computer-readable recording media such as a CD-R (CD Recordable), a DVD (Digital Versatile Disk), or a Blue-ray Disk (BD) may be used.

[Functional Configuration]

In the following, functional configurations of the transmission terminal 10, the relay apparatus 30, the transmission management system 50, and the UI providing system 80 of the transmission system 1 are described.

Figure 5B:
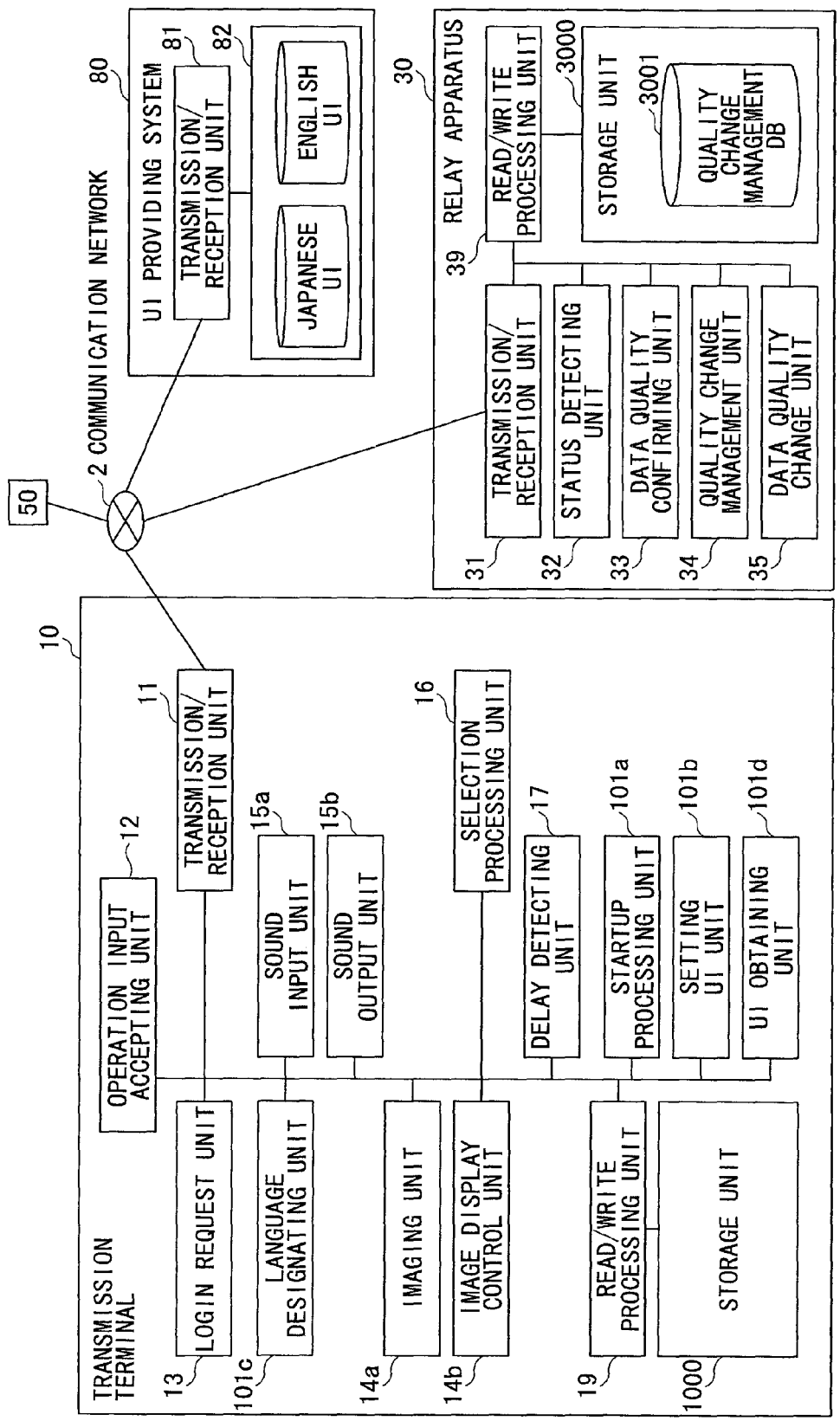

FIGS. 5A-5B are block diagrams showing the functional configuration of the transmission system 1 according to an embodiment of the present invention. In FIGS. 5A-5B, the transmission terminal 10, the relay apparatus 30, the transmission management system 50, and the UI providing system 80 are connected to each other via the network 2 so that they may exchange data with each other.

[Transmission Terminal 10]

The transmission terminal 10 includes a transmission/reception unit 11, an operation input accepting unit 12, a login request unit 13, an imaging unit 14a, an image display control unit 14b, a sound input unit 15a, a sound output unit 15b, a selection processing unit 16, a delay detecting unit 17, a read/write processing unit 19, a startup processing unit 101a, a setting UI unit 101b, a language designating unit 101c, and a UI obtaining unit 101d. The above functional units may be realized by the operation of one or more of the hardware components of the transmission terminal 10 shown in FIG. 3 based on a command from the CPU 101 in accordance with a program stored in the ROM 102, for example. The transmission terminal 10 also has a storage unit 1000 that is realized by the SSD 105 shown in FIG. 3.

In the following, the functional units of the transmission terminal 10 are described in detail. The transmission/reception unit 11 exchanges data (information) with other terminals, devices, and/or systems, and is realized by the network I/F 111 shown in FIG. 3. The operation input accepting unit 12 accepts various inputs made by a user, and is realized by the operation button 108 and the power switch 109 shown in FIG. 3. For example, when the user turns on the power switch 109, the operation input accepting unit 12 accepts the user input as a power-on command and turns on the power of the transmission terminal 10. The login request unit 13 is realized by a command from the CPU 101 and prompts the transmission/reception unit 11 to automatically transmit login request information indicating a login request and a current IP address of the transmission terminal 10 to the transmission management system 50 via the communication network 2.

The imaging unit 14a is realized by the camera 112 and the imaging device I/F 113 shown in FIG. 3. The imaging unit 14a captures an image of an imaging object and outputs image data of the captured image.

The image display control unit 14b is realized by the display I/F 117 shown in FIG. 3 and performs control operations for transmitting image data to the externally connected display 120.

The sound input unit 15a is realized by the microphone 114 and the sound input/output I/F 116 shown in FIG. 3. The sound input unit 15a inputs a sound generated by the user, converts the sound into a sound signal, and outputs sound data of the sound signal. The sound output unit 15b is realized by the speaker 115 and the sound input/output I/F 116. The sound output unit 15b converts a sound signal of sound data into sound and outputs the sound.

The selection processing unit 16 performs a selection process for selecting a relay apparatus 30 from plural relay apparatuses 30.

The delay detecting unit 17 is realized by a command from the CPU 101 and detects the delay time (ms) of image data or sound data that is transmitted from another transmission terminal 10 via the relay apparatus 30. The read/write processing unit 19 is realized by the SSD 105 shown in FIG. 3 and performs read/write operations such as storing data in the storage unit 1000 and reading data stored in the storage unit 1000. The storage unit 1000 stores various types of information such as a terminal ID (identification) for identifying the transmission terminal 10, a password, image data, sound data, a relay apparatus ID for identifying the relay apparatus 30 to which data are to be transmitted, and an IP address of a destination terminal, for example.

The startup processing unit 101a reads setting status information from the storage unit 1000 when the power of the transmission terminal 10 is turned on, determines the startup operation mode corresponding to the setting status information, and performs startup operations based on the setting status information. FIG. 6 is a table illustrating an exemplary set of the setting status information. In FIG. 6, it is assumed that the setting status information indicates the setup statuses of three setting items, "language setting," "format/time zone setting," and "network setting," and the values "0," "1," "2," "3," and "4" represent the following respective setup statuses:

"0": Initial state

"1": Language setting completed but other settings incomplete

"2": Language setting and format/time zone setting completed

"3": Setup at initial startup operations omitted (setup before shipping)

"4": All setting items, including network setting, completed,

Referring back to FIG. 5B, the setting UI unit 101b provides a setting UI for specifying various settings (e.g., language setting, format/time zone setting, network setting).

The language designating unit 101c designates the language selected in previously performed startup operations (stored in the storage unit 1000) upon sending a login request to the transmission management system 50.

The UI obtaining unit 101d obtains UI information from the UI providing system 80 that is designated in a response from the transmission management system 50. The UI information may include HTML, JavaScript, or CSS code describing a UI, for example.

It is noted that in a case where the UI information is stored within the transmission terminal 10, the language designating unit 101c may be unnecessary, and the UI obtaining unit 101d may simply obtain the UI information internally.

The terminal ID and the relay apparatus ID used in the present embodiment may be any identification information such as language, characters, a symbol, or a mark used to uniquely identify the transmission terminal 10 or the relay apparatus 30. The terminal ID and the relay apparatus ID may also be identification information combining language, characters, symbols, and/or marks, for example.

In the following descriptions, the transmission terminal 10 corresponding to a requesting terminal that sends a login request to start a television conference is referred to as "requesting terminal 10A," and the transmission terminal 10 corresponding to the destination of the request is referred to as "destination terminal 10B."

[Relay Apparatus 30]

In the following, the functional configuration of the relay apparatus 30 is described. The relay apparatus 30 includes a transmission/reception unit 31, a status detecting unit 32, a data quality confirming unit 33, a quality change management unit 34, a data quality change unit 35, and a read/write processing unit 39. The above functional units of the relay apparatus 30 may be realized by the operation of one or more of the hardware components shown in FIG. 4 based on a command from the CPU 201 according to a program stored in the ROM 202. The relay apparatus 30 also includes a storage unit 3000 that is realized by the HD 204 shown in FIG. 4.

(Quality Change Management Table)

The storage unit 3000 includes a quality change management DB 3001 storing a quality change management table such as that shown in FIG. 8. The quality change management table stores and manages an IP address of the transmission terminal 10 corresponding to an image data relaying destination and a corresponding image quality of the image data to be relayed from the relay apparatus 30 to the relaying destination.

Figure 7:
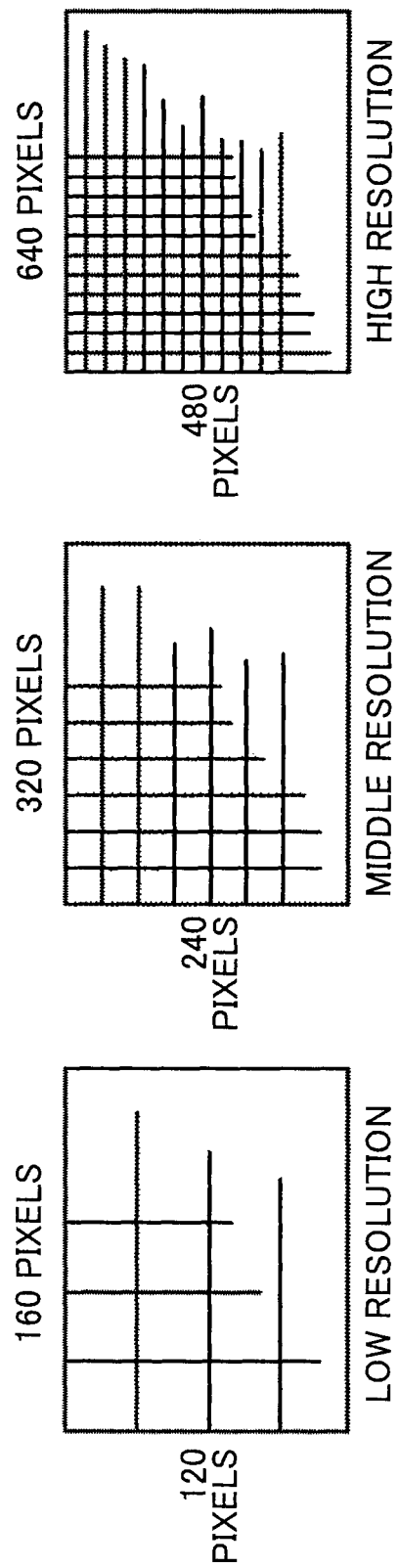
FIGS. 7A-7C illustrate different image qualities of image data to be transmitted.

In the following, the image quality of the image data to be transmitted is described. FIG. 7A shows a low resolution image corresponding to a base image having 160 horizontal pixels and 120 vertical pixels. FIG. 7B shows a medium resolution image having 320 horizontal pixels and 240 vertical pixels. FIG. 7C shows a high resolution image having 640 horizontal pixels and 480 vertical pixels. In a case where a narrow band is used as a transmission path, low quality image data including image data of the low resolution image (base image) is transmitted (relayed) by the relay apparatus 30. In a case where a relatively wide band is used, medium quality image data including image data of the low resolution image and the medium resolution image are transmitted by the relay apparatus 30. In a case where a very wide band is used, high quality image data including image data of the low resolution image, the medium resolution image, and the high resolution image are transmitted by the relay apparatus 30. For example, according to the quality change management table shown in FIG. 8, when the relay apparatus 30 is to transmit image data to the IP address "1.3.2.4" of the transmission terminal 10db as the destination terminal 10B, the relay apparatus 30 transmits image data of "high quality."

(Functional Units)

In the following, the functional units of the relay apparatus 30 are described in detail. The descriptions include the relationship between the functional units of the relay apparatus 30 shown in FIG. 5B and the hardware components of the relay apparatus 30 shown in FIG. 4.

The transmission/reception unit 31 exchanges data (information) with other terminals, devices, and systems via the communication network 2, and is realized by the network I/F 209 shown in FIG. 4. The status detecting unit 32 detects an operation status of the relay apparatus 30 and is realized by a command from the CPU 201 shown in FIG. 4. The operation status of the relay apparatus 30 may be indicated as "online," "offline," or "failure," for example.

The data quality confirming unit 33 is realized by a command from the CPU 201 shown in FIG. 4 and confirms the image quality of image data to be transmitted by searching the quality change management table (see FIG. 8) using the IP address of the destination terminal 10B as a search key and extracting the corresponding image quality of image data to be transmitted. The quality change management unit 34 is realized by a command from the CPU 201 shown in FIG. 4 and changes the information stored in the quality change management DB 3001 based on quality information transmitted from the transmission management system 50. For example, while high quality image data are exchanged in a television conference between the transmission terminal 10aa with the terminal ID "01aa" as the requesting terminal 10A and the transmission terminal 10db with the terminal ID "01db" as the destination terminal 10B, another television conference between the transmission terminal 10bb as the requesting terminal 10A and the transmission terminal 10ca as the destination terminal 10B may be started using the communication network 2, and as a result, the transmission terminal 10db may experience some delay in receiving the image data from the transmission terminal 10aa. In such a case, the relay apparatus 30 may have to degrade the image quality of the image data to be transmitted from high quality to medium quality. In turn, the quality change management unit 34 may change the information stored in the quality change management DB 3001 based on quality information indicating "medium quality" transmitted from the transmission management system 50 so that the corresponding image quality of image data to be transmitted to the transmission terminals 10aa and 10db may be changed from high quality to medium quality.

The data quality change unit 35 is realized by a command from the CPU 201 shown in FIG. 4 and changes the image quality of image data transmitted from the transmission terminal 10 according to the updated information stored in the quality change management DB 3001. The read/write processing unit 39 is realized by the HDD 205 shown in FIG. 4 and performs read/write operations such as storing data in the storage unit 3000 and reading data stored in the storage unit 3000.

[Transmission Management System 50]

In the following, the functional configuration of the transmission management system 50 is described.

The transmission management system 50 includes a transmission/reception unit 51, a terminal authentication unit 52, a status management unit 53, a terminal extracting unit 54, a terminal status obtaining unit 55, a restriction unit 56, a session management unit 57, a quality determining unit 58, a read/write processing unit 59, a delay time management unit 60, a language determining unit 61, and a UI designating unit 62. The above functional units of the transmission management system 50 may be realized by the operation of one or more of the hardware components of the transmission management system 50 shown in FIG. 4 based on a command from the CPU 201 according to a program stored in the ROM 202. The transmission management system 50 also includes a storage unit 5000 that is realized by the HD 204 shown in FIG. 4.

(Relay Apparatus Management Table)

The storage unit 5000 includes a relay apparatus management DB 5001 that stores a relay apparatus management table such as that shown in FIG. 9. The relay apparatus management table stores and manages the relay apparatus ID of the relay apparatus 30 in association with the operation status of the relay apparatus 30, the received date/time at which the status information indicating the operation status was received by the transmission management system 50, the IP address of the relay apparatus 30, and the maximum data transmission speed (Mbps) of the relay apparatus 30. For example, according to the relay apparatus management table shown in FIG. 9, the operation status of the relay apparatus 30a with the relay apparatus ID "111a" is indicated as "online," the received date/time at which the status information was received by the transmission management system 50 is "2009.11.10.13:00," the IP address of the relay apparatus 30a is "1.2.1.2," and the maximum data transmission speed of the relay apparatus 30a is "100" (Mbps).

(Terminal Authentication Management Table)

The storage unit 5000 also includes a terminal authentication management DB 5002 that stores a terminal authentication management table such as that shown in FIG. 10. The terminal authentication management table stores and manages the terminal IDs of the transmission terminals 10 that are managed by the transmission management system 50 in association with their corresponding passwords. For example, according to the terminal authentication table shown in FIG. 10, the terminal ID of the transmission terminal 10aa is "01aa" and its corresponding password is "aaaa."

(Terminal Management Table)

The storage unit 5000 also includes a terminal management DB 5003 that stores a terminal management table such as that shown in FIG. 11. The terminal management table stores and manages the terminal ID of the transmission terminal 10 in association with the corresponding operation status of the transmission terminal 10, the received date/time at which the login request information from the transmission terminal 10 was received by the transmission management system 50, and the IP address of the transmission terminal 10. For example, according to the terminal management table shown in FIG. 11, the operation status of the transmission terminal 10aa with the terminal ID "01aa" is indicated as "online," the received date/time at which the login request information was received by the transmission management system 50 is "2009.11.10.13:40," and the IP address of the transmission terminal 10aa is "1.2.1.3."

(Destination List Management Table)

The storage unit 5000 also includes a destination list management DB 5004 that stores a destination list management table such as that shown in FIG. 12. The destination list management table stores and manages the terminal ID of the requesting terminal 10A that sends a request to start a television conference in association with the terminal IDs of the transmission terminals 10 that are registered as destination terminal 10B candidates. For example, according to the destination list management table shown in FIG. 12, the transmission terminal 10aa with the terminal ID "01aa" as the requesting terminal 10A may send a request to start a television conference with transmission terminals 10ab, 10ba, 10db with the terminal IDs "01ab," "01ba," or "01db" as the destination terminal 10B candidates that may establish communication with the transmission terminal 10aa. The information on the destination terminal 10B candidates may be updated by adding or deleting one or more terminal IDs in response to an add/delete request sent from the requesting terminal 10A to the transmission management system 50.

(Session Management Table)

The storage unit 5000 also includes a session management DB 5005 that stores a session management table such as that shown in FIG. 13. The session management table stores and manages selection session IDs that are used to execute a session for selecting the relay apparatus 30 in association with the corresponding relay apparatus. ID of the relay apparatus 30 to be used to receive and transmit image data and sound data, the terminal ID of the requesting terminal 10A, the terminal ID of the destination terminal 10B, the image data reception delay time (ms) experienced by the destination terminal 10B, and the received date/time at which the delay information indicating the image data reception delay time transmitted from the destination terminal 10B is received by the transmission management system 50. For example, according to the session management table shown in FIG. 13, the relay apparatus 30a with the relay apparatus ID "111a" is selected in a session identified by the selection session ID "sel," and the selected relay apparatus 30a receives and transmits image data and sound data exchanged between the transmission terminal 10aa with the terminal ID "01aa" as the requesting terminal 10A and the transmission terminal 10db with the terminal ID "01db" as the destination terminal 10B. Also, the data reception delay time experienced by the transmission terminal 10db (destination terminal 10B) as of the date/time "2009.11.10.14:00" is "200" (ms). It is noted that in the case where a television conference is held between two transmission terminals 10, the received date/time of the delay information may be managed based on the delay information transmitted from the requesting terminal 10A rather than the destination terminal 10B. In the case where a television conference is held between three or more transmission terminals 10, the received date/time of the delay information is managed based on delay information transmitted from the transmission terminal 10 receiving the image data and sound data.

(Address Priority Management Table)

The storage unit 5000 also includes a priority management DB 5006 that stores an address priority management table such as that shown in FIG. 14. The address priority management table stores and manages address priority points in accordance with the degree of similarity between two given IP addresses. In FIG. 14, the address priority points are assigned based on the conformity of the values of four dot address portions of the IP addresses corresponding to IPv4 addresses, the higher the conformity, the higher the address priority points. For example, the address priority "5" is assigned for a case where the top three dot address portions of the IP addresses have the same value ("SAME") and only the last dot address portions of the IP addresses are different ("DIF"). Also, the address priority "3" is assigned for a case where the top two dot address portions of the IP address have the same value. In this case, the values of the last dot address portions of the IP addresses are disregarded. Also, the address priority "1" is assigned for a case where the top dot address portion of the IP addresses have the same value. In this case, the values of the third and last dot address portions of the IP addresses are disregarded. Also, the address priority "0" is assigned for a case where the top dot address portion of IP addresses are different. In this case, the values of the remaining dot portions of the IP addresses are disregarded.

(Transmission Speed Priority Management Table)

The priority management DB 5006 of the storage unit 5000 also stores a transmission speed priority management table such as that shown in FIG. 15. The transmission speed priority management table stores and manages transmission speed priority points according to the maximum transmission speeds (Mbps) of the relay apparatuses 30, the higher the maximum transmission speed, the higher the transmission speed priority points. For example, in the transmission speed priority management table shown in FIG. 15, the transmission speed priority "5" is assigned for a case where the maximum transmission speed of the relay apparatus 30 is 1000 Mbps or higher. The transmission speed priority "3" is assigned for a case where the maximum transmission speed of the relay apparatus 30 is at least 100 Mbps but not more than 1000 Mbps. The transmission speed priority "1" is assigned for a case where the maximum transmission speed of the relay apparatus 30 is at least 10 Mbps but not more than 100 Mbps. The transmission speed priority "0" is assigned for a case where the maximum transmission speed of the relay apparatus 30 is less than 10 Mbps.

(Quality Management Table)

The storage unit 5000 also includes a quality management DB 5007 that stores a quality management table such as that shown in FIG. 16. The quality management table stores and manages the image quality of image data to be transmitted by the relay apparatus 30 according to the image data reception delay time (ms) at the requesting terminal 10A or the destination terminal 10B.

(Functional Units)

In the following, the functional units of the transmission management system 50 are described in detail. Also, the descriptions include the relationships between the functional units of the transmission management system 50 shown in FIG. 5A and the hardware components of the transmission management system 50 shown in FIG. 4.

The transmission/reception unit 51 exchanges data (information) with other terminals, devices, and systems via the communication network 2 and is realized by the network I/F 209 shown in FIG. 4. The terminal authentication unit 52 performs terminal authentication by searching the terminal authentication management DB 5002 of the storage unit 5000 using a terminal ID and password included in login information received via the transmission/reception unit 51 and determining whether the same terminal ID and password are stored in the terminal authentication management DB 5002. The status management unit 53 stores and manages the terminal ID of the requesting terminal 10A in association with the corresponding operation status of the requesting terminal 10A, the received date/time at which the login request information from the requesting terminal 10A was received by the transmission management system 50, and the IP address of the requesting terminal 10A in the terminal management table (see FIG. 11) that manages the operation status of the requesting terminal 10A that makes a login request.

The terminal extracting unit 54 extracts terminal IDs of the destination terminal 10B candidates by searching the destination list management table (see FIG. 12) using the terminal ID of the requesting terminal 10A that has made the login request as a search key and, reading the terminal IDs of the corresponding destination terminal 10B candidates that may establish communication with the requesting terminal 10A. The terminal extracting unit 54 also extracts the terminals IDs of other transmission terminals 10 that have the terminal ID of the above requesting terminal 10A registered as a destination terminal 10B candidate.

The terminal status obtaining unit 55 searches the terminal management DB (see FIG. 11) using the terminal IDs of the destination terminal 10B candidates extracted by the terminal extracting unit 54 and reads the operation status registered for each of the extracted terminal IDs. That is, the terminal status obtaining unit 55 obtains the operation status of the destination terminal 10B candidates that may establish communication with the requesting terminal 10A. The terminal status obtaining unit 55 also searches the terminal management table (see FIG. 11) using the terminal ID extracted by the terminal extracting unit 54 to obtain the operation status of the requesting terminal 10A that has made the login request.

The restriction unit 56 supports a restriction process for restricting the relay apparatuses 30 to be selected for use in establishing communication between the terminal apparatuses 10.

The session management unit 57 stores and manages selection session IDs in association with the terminal ID of the requesting terminal 10A and the terminal ID of the destination terminal 10B in the session management table (see FIG. 13) of the storage unit 5000. The session management unit 57 also stores and manages the relay apparatus ID of the relay apparatus 30 ultimately selected in association with the corresponding selection session ID in the session management table (see FIG. 13).

The quality determining unit 58 determines the image quality of the image data to be transmitted by the relay apparatus 30 by searching the quality management table (see FIG. 16) using the image data delay time as a search key and extracting the corresponding image quality. The read/write processing unit 59 is realized by the HDD 205 shown in FIG. 4 and performs data read/write operations such as storing data in the storage unit 5000 and reading data stored in the storage unit 5000. The delay time management unit 60 searches the terminal management table (see FIG. 11) using the IP address of the destination terminal 10B as a search key to extract the corresponding terminal ID of the destination terminal 10B. The delay time management unit 60 also stores the image data delay time indicated by the delay information in the delay time field of the corresponding record for the extracted terminal ID included in the session management table (see FIG. 13).

The language determining unit 61 determines the language to be used based on a language designation transmitted from the transmission terminal 10 along with the login request.

The UI designating unit 62 transmits UI resource information to the transmission terminal 10. The UI resource information indicates the address of the UI providing system 80 from which a UI may be obtained according to the language determined by the language determining unit 61. FIG. 17 shows an exemplary language table that may be stored in the UI designating unit 62. The language table includes language information such as "ja" (Japanese) and "en" (English) and corresponding addresses of the UI providing system 80 from which a UI may be obtained. The address may identify the UI providing system 80 as well as the UI information in the corresponding language, for example.

It is noted that in the case where the transmission terminal 10 stores the UI information internally, the language determining unit 61 and the UI designating unit 62 may be unnecessary.

[UI Providing System 80]

In the following, the functional configuration of the UI providing system 80 is described.

As is shown in FIG. 5B, the UI providing system 80 includes a transmission/reception unit 81 and UI information 82. The transmission/reception unit 81 exchanges information with the transmission terminal 10, and when the transmission/reception unit 81 receives a UI information request from the transmission terminal 10 to obtain UI information, the transmission/reception unit 81 obtains the UI information in the corresponding language from the UI information 82 and transmits the obtained UI information to the transmission terminal 10 that has made the UI information request.

[Transmission System Operations]

Figure 18:
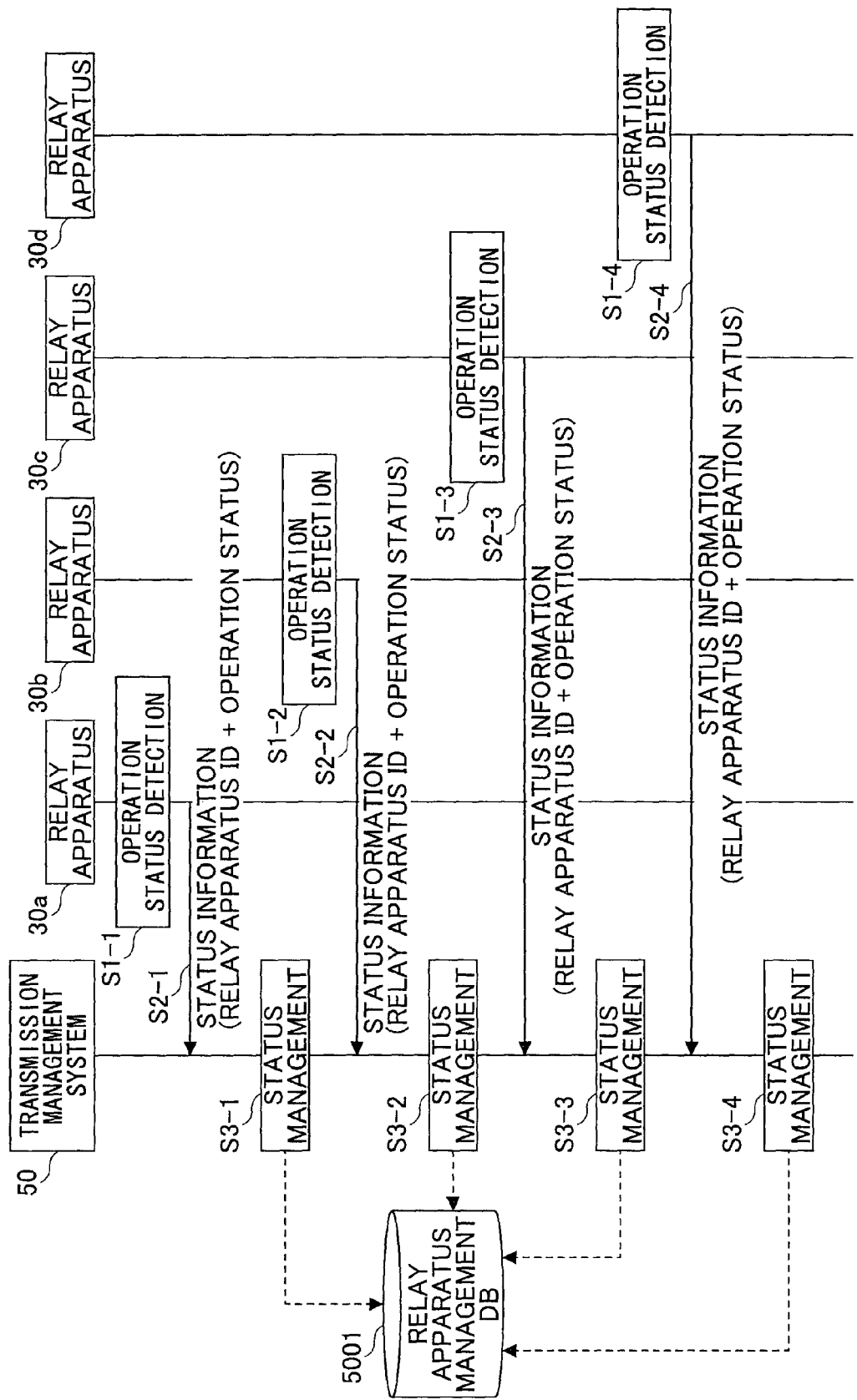
FIG. 18 is a sequence chart showing exemplary process steps for managing status information indicating the operation statuses of relay apparatuses.
Figure 19:
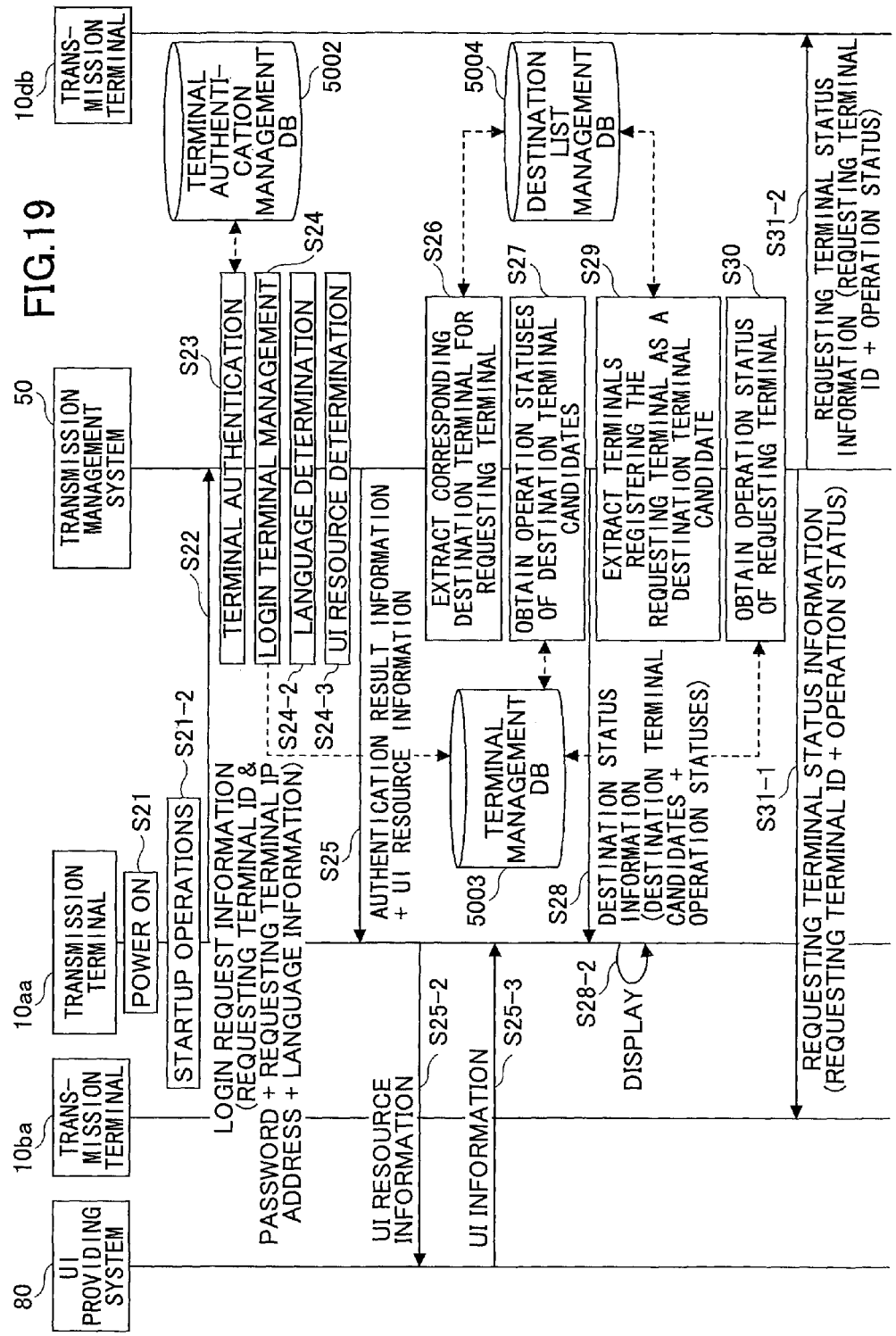
FIG. 19 is a sequence chart showing exemplary process steps performed in preparation for starting communication between transmission terminals.
Figure 21A:
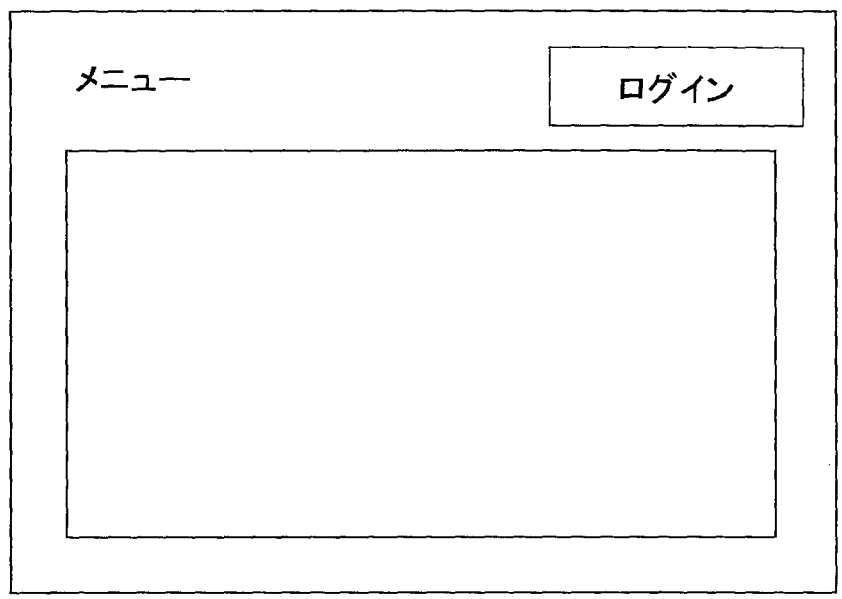
FIGS. 21A-21B show exemplary menus corresponding to user interfaces.
Figure 21B:
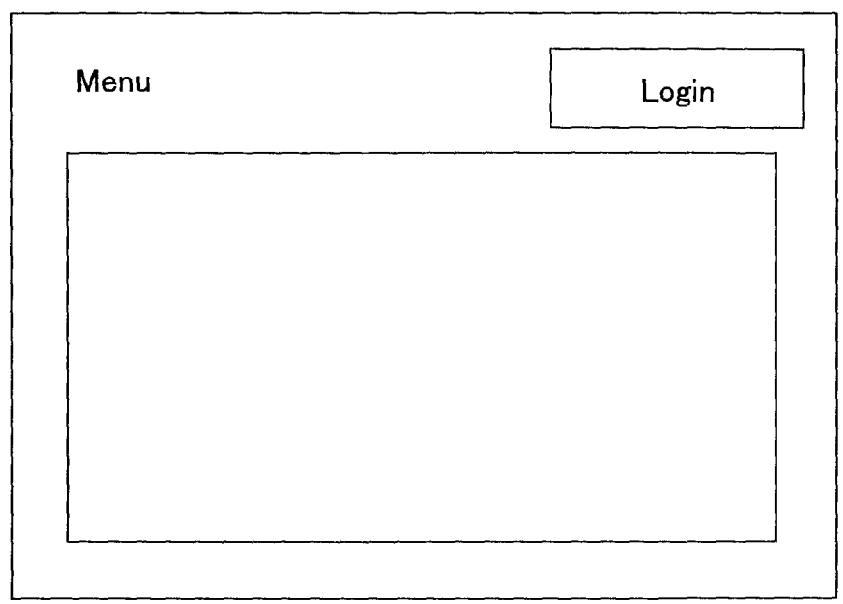
Figure 22:
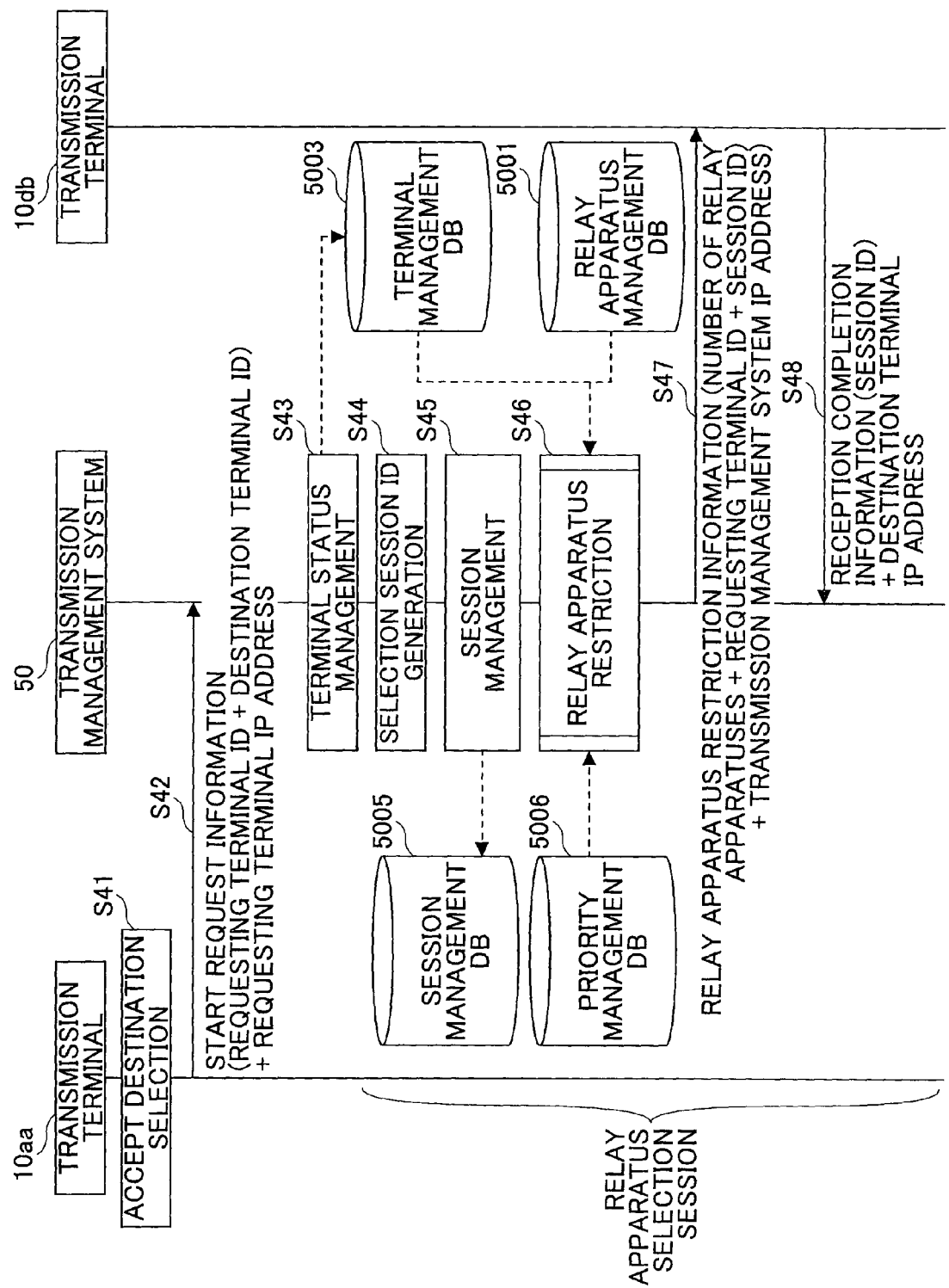
FIG. 22 is a sequence chart showing exemplary process steps for restricting relay apparatuses.
Figure 23:
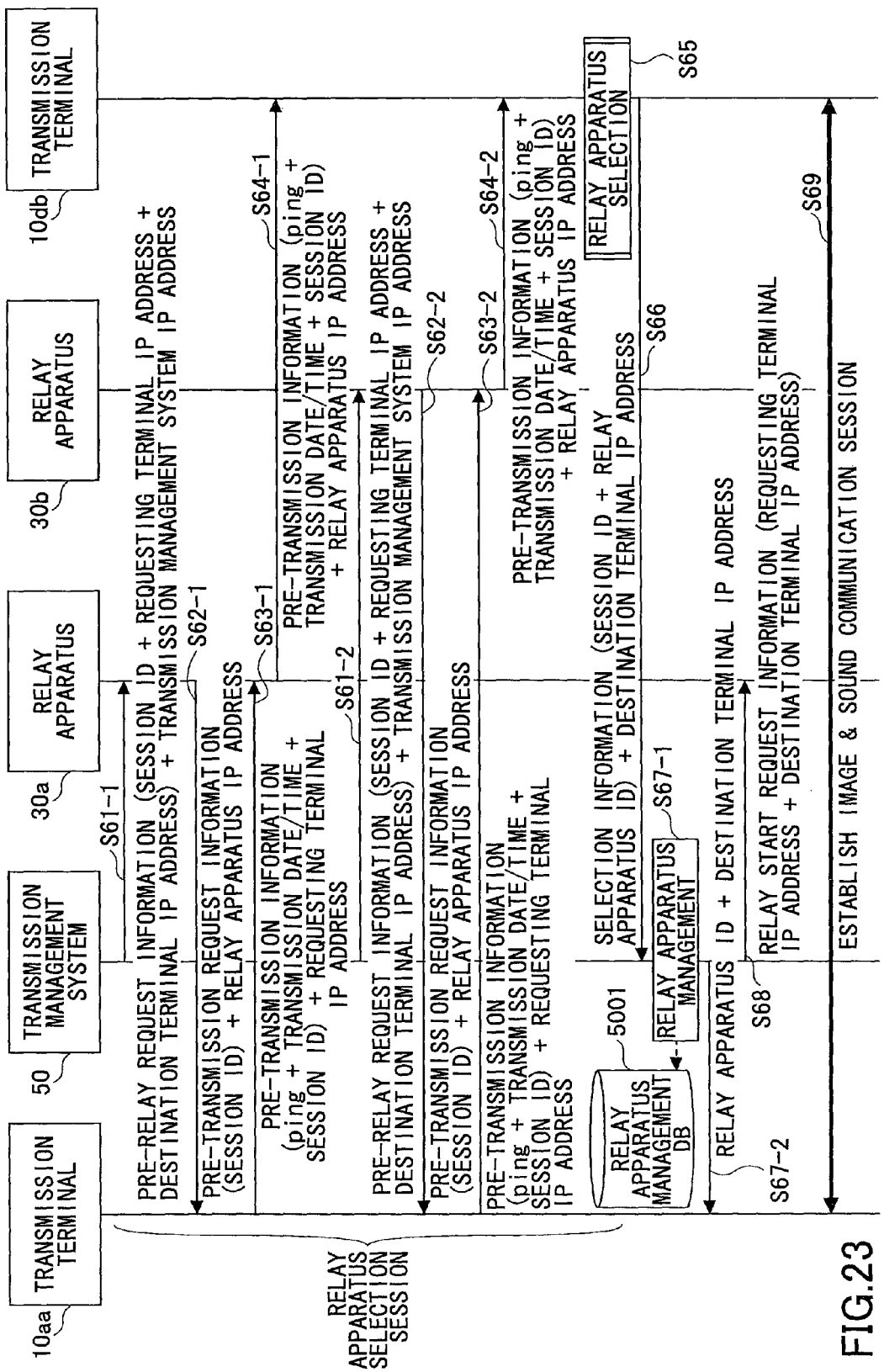
FIG. 23 is a sequence chart showing exemplary process steps for selecting the relay apparatus to be used.

In the following, operations of the transmission system 1 are described with reference to FIGS. 18-24. FIG. 18 is a sequence chart showing exemplary process steps for managing status information indicating the operation status of the relay apparatus 30 at the transmission management system 50. FIG. 19 is a sequence chart showing exemplary process steps performed in preparation for starting communication between plural transmission terminals 10. FIG. 22 is a sequence chart showing exemplary process steps for restricting the relay apparatuses 30 to select one relay apparatus 30. FIG. 23 is a sequence chart showing exemplary process steps of the transmission terminal 10 for selecting the relay apparatus 30. FIG. 24 is a sequence chart showing exemplary process steps for exchanging image data and sound data between the transmission terminals 10.

First, exemplary process steps for managing status information indicating the operation status of the relay apparatus 30 at the transmission management system 50 are described with reference to FIG. 18.

In the illustrated example shown in FIG. 18, at each of the relay apparatuses 30a-30d (also referred to as "relay apparatus 30" hereinafter), the status detecting unit 32 (see FIG. 5B) periodically detects the operation status of its own apparatus (S1-1 to S1-4). Then, in order to enable the transmission management system 50 to manage the operation status of the relay apparatus 30 in real time, the transmission/reception unit 31 of the relay apparatus 30 periodically transmits status information to the transmission management system 50 via the communication network 2 (S2-1 to S2-4). The status information includes the relay apparatus ID of the relay apparatus 30 and the operation status of the relay apparatus 30 detected by the status detecting unit 32. In the example described below, it is assumed that the relay apparatuses 30a, 30b, and 30d are operating normally so that their operation statuses are indicated as "online" whereas the relay apparatus 30c is operating but is indicated as "offline" due to some problems occurring in the program for executing relay operations at the relay apparatus 30c.

Next, at the transmission management system 50, the transmission/reception unit 51 receives the status information transmitted from the relay apparatus 30, and stores the status information in association with the corresponding relay apparatus ID in the relay apparatus management table (see FIG. 9) of the storage unit 5000 via the read/write processing unit 59 (S3-1 to S3-4). In this way, the status information indicating the operation status of the relay apparatus 30 as "online," "offline," or "failure" may be stored in association with the corresponding relay apparatus ID in the relay apparatus management table (see FIG. 9). Also, the received date/time at which the status information was received by the transmission management system 50 is stored in association with the corresponding relay apparatus ID. It is noted that in a case where the status information is not transmitted from the relay apparatus 30, the operation status field and the received data/time field of the record for the corresponding relay apparatus 30 included in the relay apparatus management table shown in FIG. 9 may be left blank or the operation status and the received date/time received on a previous occasion may be indicated.

In the following, exemplary process steps in preparation for starting communication between the transmission terminal 10aa and the transmission terminal 10db are described with reference to FIG. 19.

At the transmission terminal 10aa, when a user turns on the power switch 109 (see FIG. 3), the operation input accepting unit 12 (see FIG. 5B) accepts the user input as a power-on command input and turns on the power of the transmission terminal 10aa (step S21).

Figure 20:
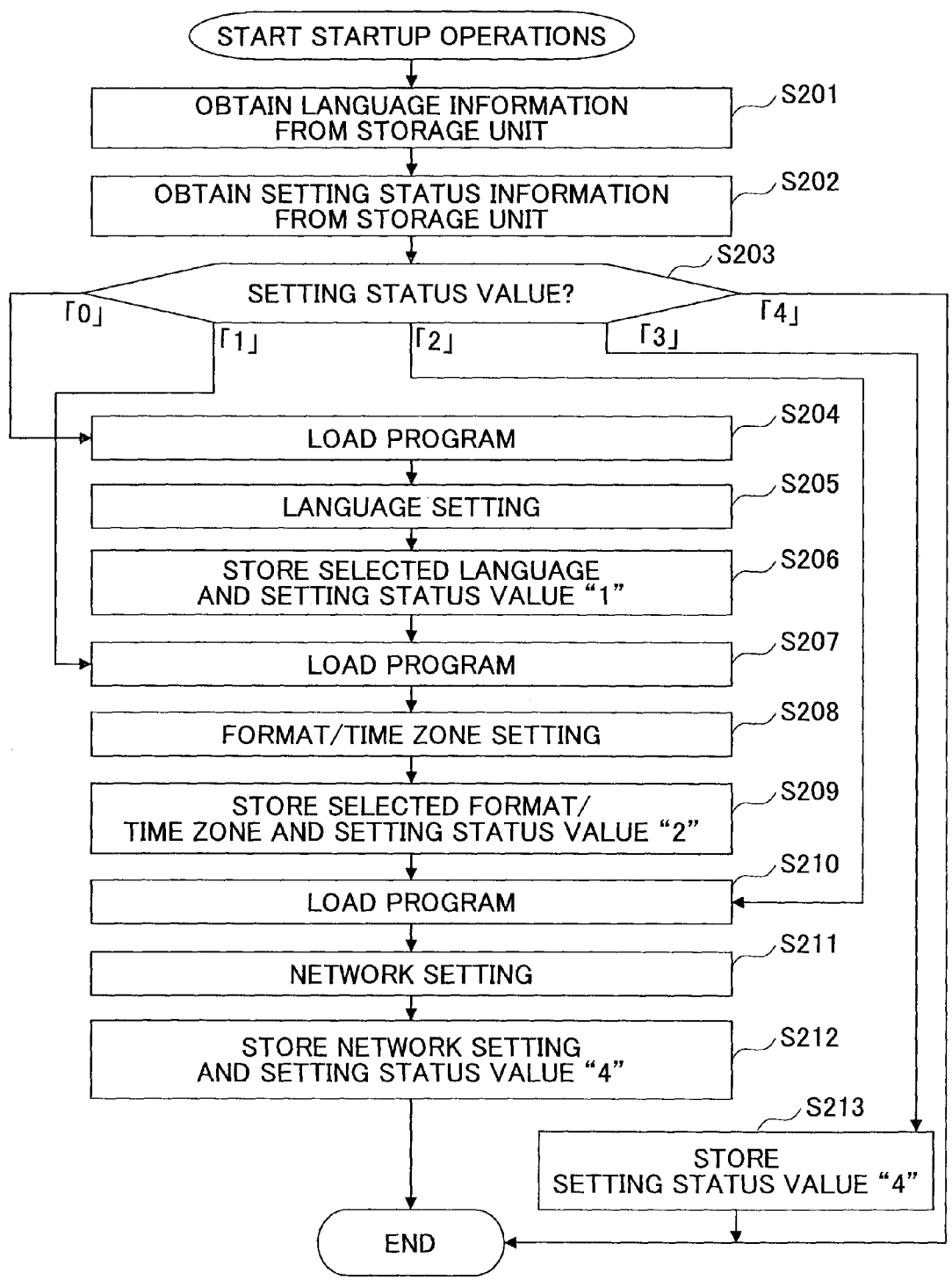
FIG. 20 is a flowchart showing exemplary startup operations of the transmission terminal.

When the power of the transmission terminal 10aa is turned on, the startup processing unit 101a (see FIG. 5B) performs startup operations (S21-2), which is described below with reference to FIG. 20.

Then, the login request unit 13 automatically transmits login request information indicating a login request from the transmission/reception unit 11 to the transmission management system 50 via the communication network 2 (S22). The login request information includes the terminal ID and password of the transmission terminal 10aa corresponding to the requesting terminal 10A. The terminal ID and the password correspond to data that are read from the storage unit 1000 via the read/write processing unit 19 and transmitted to the transmission/reception unit 11. It is noted that when the transmission terminal 10aa transmits the login request information to the transmission management system 50, the transmission management system 50 receiving the login request information is able to determine the IP address of the transmission terminal 10aa that is transmitting the login request information. Also, it is noted that language information indicting the language designated by the language designating unit 101c in the startup operations (obtained from the storage unit 1000) is transmitted to the transmission management system 50 along with the login request information.

Then, the terminal authentication unit 52 of the transmission management system 50 performs terminal authentication by searching the terminal authentication management table (see FIG. 10) of the storage unit 5000 using the terminal ID and the password included in the login request information received via the transmission/reception unit 51 as search keys and determining whether the same terminal ID and password are stored in the terminal authentication management DB 5002 (S23). If the terminal authentication unit 52 determines that the same terminal ID and password are stored in the terminal authentication management DB 5002 so that the login request received from the transmission terminal 10aa is a legitimate login request from a terminal with proper authorization, the status management unit 53 stores the terminal ID of the transmission terminal 10aa in association with its operations status, the received date/time at which the login request information was received by the transmission management system 50, and the IP address of the transmission terminal 10aa in the terminal management table (see FIG. 11) (S24). In this way, the transmission ID "01aa" of the transmission terminal 10aa may be stored in association with the operation status "online," the received date/time "2009.11.10.13:40," and the IP address "1.2.1.3" in the terminal management table shown in FIG. 11, for example.

Also, the language determining unit 61 of the transmission management system 50 determines (recognizes) the designated language from the language information that is transmitted from the transmission terminal 10aa along with the login request information (S24-2). The UI designating unit 62 refers to the language table (see FIG. 17) and obtains UI resource information corresponding to the language information (S24-3).

Then, the transmission/reception unit 51 of the transmission management system 50 transmits authentication result information indicating the authentication result obtained by the terminal authentication unit 52 and the UI resource information obtained by the UI designating unit 62 to the transmission terminal 10aa corresponding to the requesting terminal 10A via the communication network 2 (S25). In the example described below, it is assumed that the terminal authentication unit 52 determines that the transmission terminal 10aa is a terminal with proper authorization.

Upon receiving the authentication result information and the UI resource information, the transmission terminal 10aa sends a request to the UI providing system 80 according to the UI resource information to obtain UI information (S25-2). When the transmission/reception unit 81 of the UI providing system 80 receives the request from the transmission terminal 10aa, the transmission/reception unit 81 obtains the UI information in the corresponding language from the UI information 72 and transmits the obtained UI information to the transmission terminal 10aa (S25-3).

Meanwhile, the terminal extracting unit 54 of the transmission management system 50 searches the destination list management table (see FIG. 12) using the terminal ID "01aa" of the transmission terminal 10aa corresponding to the requesting terminal 10A that has made the login request as a search key and extracts (reads) the terminal IDs of the destination terminal 10B candidates that are capable of establishing communication with the transmission terminal 10aa corresponding to the requesting terminal 10A (S26). In the case of using the destination list management table shown in FIG. 12, the terminal IDs "01ab," "01ba," and "01db" of the transmission terminals 10ab, 10ba, and 10db that are stored in association with the terminal ID "01aa" of the transmission terminal 10aa may be extracted.

Then, the terminal status obtaining unit 55 searches the terminal management table (see FIG. 11) using the terminal IDs "01ab," "01ba," and "01db" of the destination terminal 10B candidates extracted by the terminal extracting unit 54 as search keys, and obtains the status information of each of the corresponding transmission terminals 10ab, 10ba, and 10db by reading the operation status stored in association with each of the terminal IDs ("offline," "online," and "online" in FIG. 11) (S27).

Then, the transmission/reception unit 51 transmits destination status information including the terminal IDs used as search keys in step S27 ("01ab," "01ba," and "01db") and the operation statuses of the corresponding transmission terminals 10ab, 10ba, and 10db ("offline," "online," and "online") to the transmission terminal 10aa via the communication network 2 (S28). In this way, the transmission terminal 10aa as the requesting terminal 10A obtains information on the current operation statuses ("offline," "online," and "online") of the transmission terminals 10ab, 10ba, and 10db corresponding to destination terminal 10B candidates that are capable of establishing communication with the transmission terminal 10aa. Then, the transmission terminal 10aa displays a menu (UI) based on the UI information obtained from the UI providing system 80 in step S25-3 (S28-2). FIG. 21A shows an exemplary Japanese menu displayed based on Japanese UI information. FIG. 21B shows an exemplary English menu displayed based on English UI information.

Also, the terminal extracting unit 54 of the transmission management system 50 searches the destination list management table (see FIG. 12) using the terminal ID "01aa" of the transmission terminal 10aa corresponding to the requesting terminal 10A as a search key, and extracts the terminal IDs of transmission terminals 10 that have the terminal ID "01aa" of the transmission terminal 10aa registered as a destination terminal 10B candidate (S29). In the destination list management table shown in FIG. 12, the records for the terminal IDs "01ab," "01ba," and "01db" include the terminal ID "01aa" as a destination terminal 10B candidate so that these terminal IDs are extracted in step S29.

Then, the terminal status obtaining unit 55 of the transmission management system 50 searches the terminal management table (see FIG. 11) using the terminal ID "01aa" of the transmission terminal 10aa as a search key, and obtains the operation status of the transmission terminal 10aa (S30).

Then, of the transmission terminals 10ab, 10ba, and 10db with the terminal IDs "01ab," "01ba," and "01db" extracted in step S29, the transmission/reception unit 51 transmits requesting terminal status information to the transmission terminals 10ba and 10db whose operation statuses are indicated as "online" in the terminal management table (see FIG. 11) (S31-1, S31-2). The requesting terminal status information includes the terminal ID "01aa" of the transmission terminal 10aa and its operation status "online" obtained in step S30. It is noted that when transmitting the requesting terminal status information to the transmission terminals 10ba and 10db, the transmission/reception unit 51 refers to the terminal management table (see FIG. 11) to find the IP addresses of the transmission terminals 10ba and 10db based on the their terminal IDs "01ba" and "01db." In this way, the requesting terminal status information indicating the terminal ID "01aa" of the transmission terminal 10aa corresponding to the requesting terminal 10A and its operation status "online" may be transmitted to the transmission terminals 10ba and 10db corresponding to destination terminal 10B candidates that are capable of establishing communication with the transmission terminal 10aa.

Further it is noted that when the user turns on the power switch 109 (see FIG. 4) of another transmission terminal 10 in a manner similar to step S21, the operation input accepting unit 12 (see FIG. 5B) of that transmission terminal 10 accepts the user input as a power-on command, and process steps similar to steps S22 through S31-1/S31-2 described above may be performed.

In the following, exemplary startup operations of the transmission terminal 10 (step S21-1 of FIG. 19) are described in detail with reference to FIG. 20.

When startup operations of the transmission terminal 10 are started, the startup processing unit 101a obtains language information and setting status information from the storage unit 1000 (S201, S202), and determines the next process step to be performed according to the value of the setting status information obtained in step S202 (S203). In the present example, it is assumed that the startup operations are performed based on the setting status information as defined in FIG. 6.

When the value of the setting status information is "0," the startup processing unit 101a loads a program for the UI setting unit 101*b* to configure a language setting UI (S204), and prompts the user to specify a language via the language setting UI provided by the setting UI unit 101*b* (S205).

When the language setting is completed, the startup processing unit 101*a* stores the language setting information indicating the language specified by the user in the storage unit 1000 and sets the value of the setting status information equal to "1" (S206).

Then, the startup processing unit 101*a* loads a program for the UI setting unit 101*b* to configure a format/time zone setting UI (S207), and prompts the user to specify a format/time zone via the format/time zone UI provided by the setting UI unit 101*b* (S208).

When the format/time zone setting is completed, the startup processing unit 101*a* stores the format/time zone setting information indicating the format/time zone specified by the user in the storage unit 1000 and sets the value of the setting status information equal to "2" (S209).

Then, the startup processing unit 101*a* loads a program for the setting UI unit 101*b* to configure a network setting UI (S210), and prompts the user to specify network settings via the network setting UI provided by the setting UI unit 101*b* (S211).

When the network setting is completed, the startup processing unit 101*a* stores the network setting information indicating the network specified by the user in the storage unit 1000, and sets the value of the setting status information equal to "4" (S212). Then, the startup processing unit 101*a* ends the startup operations.

When the value of the setting status information obtained in step S202 is "1," steps S204-206 are skipped and the process is started from step S207.

When the value of the setting status information obtained in step S202 is "2," steps S204-209 are skipped and the process is started from step S210.

When the value of the setting status information obtained in step S202 is "3," the startup processing unit 101*a* sets the value of the setting status information stored in the storage unit 100 equal to "4" and ends the startup operations.

When the value of the setting status information obtained in step S202 is "4," the startup processing unit 101*a* simply ends the startup operations without performing any particular process.

By performing the above process steps, setting items that have been set up may be saved and the user may not have to set up the setting items once more when the power is turned off before completion of the setup operations. In this way, usability of the transmission terminal 10 may be improved, for example.

In the following, exemplary process steps for selecting the relay apparatus 30 to be used are described with reference to FIG. 22. According to the destination status information received by the transmission terminal 10*aa* in step S28 indicating that the operation statuses of the transmission terminals 10*ba* and 10*db* are "online," the transmission terminal 10*aa* may establish communication with at least one of transmission terminal 10*ba* or 10*db*. In the example described below, it is assumed that the user of the transmission terminal 10*aa* corresponding to the requesting terminal 10A has chosen to establish communication with the transmission terminal 10*db* as the destination terminal 10B.

When the user presses the operation button 108 (see FIG. 3) to select the transmission terminal 10*db*, the operation input accepting unit 12 (see FIG. 5B) accepts the user input as a request to start communication with the transmission terminal 10*db* (S41). Then, the transmission/reception unit 11 of the transmission terminal 10*aa* transmits start request information including a communication start request, the terminal ID "01aa" of the transmission terminal 10*aa*, and the terminal ID "01db" of the transmission terminal 10*db* to the transmission management system 50 (S42). In this way, the transmission/reception unit 51 of the transmission management system 50 may receive the start request information and determine the IP address "1.2.1.3" of the transmission terminal 10*aa* corresponding to the sender of the start request information. Then, based on the terminals IDs "01aa" and "01db" of the terminal apparatuses 10*aa* and 10*db* included in the start request information, the status management unit 53 changes the information indicated in the operation status fields of the records for the terminals IDs "01aa" and "01db" included in the terminal management table (see FIG. 11) to "communicating" (S43). It is noted that the operation status "communicating" indicates that although the transmission terminals 10*aa* and 10*db* have not yet started communication with each other, their communication lines are currently in use so that when other transmission terminals 10 attempt to establish communication with the transmission terminal 10*aa* or 10*db*, a so-called busy tone or display will be output.

In the following, exemplary process steps for executing a session for selecting the relay apparatus 30 are described with reference to steps S44-48 and steps S61-66 of FIG. 22. In the present example, first, a selection session ID "sel" used for executing a session for selecting the relay apparatus 30 is generated (S44). Then, the session management unit 57 stores the selection session ID "sel" generated in step S44 in association with the terminal ID "01aa" of the transmission terminal 10*aa* corresponding to the requesting terminal 10A and the terminal ID "01db" of the transmission terminal 10*db* corresponding to the destination terminal 10B in the session management table (see FIG. 13) of the storage unit 5000 (S45).

Then, the restriction unit 56 of the transmission management system 50 performs a first restriction process for restricting the relay apparatuses 30 to be selected for use in establishing communication between the transmission terminals 10*aa* and 10*db* based on the relay apparatus management DB 5001, the terminal management DB 5003, and the priority management DB 5006 (S46).

When the restriction process of step S46 is completed, the transmission/reception unit 51 (see FIG. 5A) transmits relay apparatus restriction information indicating the number of relay apparatuses 30 remaining after the restriction process to the transmission terminal 10*db* corresponding to the destination terminal 10B via the communication network 2 (S47). In the present example, the relay apparatus restriction information includes the number "2" as the number of relay apparatuses 30 remaining after the restriction process, the terminal ID "01aa" of the transmission terminal 10*aa* corresponding to the requesting terminal 10A, and the selection session ID "sel." In this way, the transmission terminal 10*db* may be notified of the number of relay apparatuses 30 and the requesting terminal 10A seeking to establish communication with the transmission terminal 10*db* in the relay apparatus selection session identified by the selection session ID "sel." Also, the transmission terminal 10*db* may determine the IP address "1.1.1.2" of the transmission management system 50 corresponding to the sender of the relay apparatus restriction information.

Then, the transmission terminal 10*db* transmits from the transmission/reception unit 11 reception completion information indicating that reception of the relay apparatus restriction information has been completed to the transmission management system 50 via the communication network 2 (S48). The reception completion information includes the session ID "sel." In this way, the transmission management system 50 may be notified of the completion of the transmission of the relay apparatus restriction information of the relay apparatus selection session identified by the selection session ID "sel" and may determine the IP address "1.3.2.4" of the transmission terminal 10*db* corresponding to the sender of the reception completion information.

In the following, exemplary process steps performed by the transmission terminal 10*aa* for selecting the relay apparatus 30 to be used are described with reference to FIG. 23. First, before starting the television conference, the transmission management system 50 transmits pre-relay request information to each of the relay apparatuses 30*a* and 30*b* corresponding to the relay apparatuses remaining after the restriction process performed in step S46 (S61-1 and S61-2). The pre-relay request information includes the selection session ID "sel," the IP address of the transmission terminal 10*aa* corresponding to the requesting terminal 10A, and the IP address of the transmission terminal 10*db* corresponding to the destination terminal 10B. In this way, the relay apparatuses 33*a* and 30*b* may determine the selection session ID of the session, the terminal ID of the requesting terminal 10A, and the terminal ID of the destination terminal 10B. The relay apparatuses 30*a* and 30*b* may also determine the IP address "1.1.1.2" of the transmission management system 50.

Then, at each of the relay apparatuses 30*a* and 30*b*, the transmission/reception unit 31 transmits pre-transmission request information to the transmission terminal 10*aa* identified as the requesting terminal 10A in steps S61-1 and S61-2 (S62-1 and S62-2). The pre-transmission request information indicates a request to have pre-transmission information including a ping (Packet Internet Groper) transmitted from the transmission terminal 10*aa* before starting the television conference and includes the selection session ID "sel." In this way, the transmission terminal 10*aa* may be notified of the transmission request for the pre-transmission information from the relay apparatuses 30*a* and 30*b* and may also determine the IP addresses "1.2.1.2" and "1.2.2.2" of the relay apparatuses 30*a* and 30*b* during the relay apparatus selection process executed in the session identified by the selection session ID "sel."

It is noted that in the present example, the transmission management system 50 does not communicate the IP address of the transmission terminal 10*db* corresponding to the destination terminal 10B to the transmission terminal 10*aa* corresponding to the requesting terminal 10A. Instead, the transmission management system 50 communicates the IP address of the transmission terminal 10*db* to the relay apparatuses 30*a* and 30*b* (S61-1 and S61-2) and the relay apparatuses 30*a* and 30*b* each send pre-transmission request information to the transmission terminal 10*aa* requesting pre-transmission information from the transmission terminal 10*aa* (S62-1 and S62-2). That is, in the present example, the IP addresses of the transmission terminals 10 are not revealed to the other transmission terminals 10 so that security may be ensured, for example.

Then, the transmission terminal 10*aa* transmits pre-transmission information to the relay apparatuses 30*a* and 30*b* from the transmission/reception unit 11 via the communication network 2 (S63-1 and S63-2). The transmission terminal 10*aa* transmits the pre-transmission information to the transmission terminal 10*db* via the relay apparatuses 30*a* and 30*b* before actually transmitting image data and/or sound data. The pre-transmission information is used to measure the time it takes for the transmission terminal 10*db* to receive information transmitted from the transmission terminal 10*aa*. The pre-transmission information includes a ping for confirming that the transmission terminal 10*aa*, the relay apparatuses 30*a* and 30*b*, and the transmission terminal 10*db* are connected so that they may establish communication with each other, the transmission date/time at which the pre-transmission information was transmitted from the transmission terminal 10*aa*, and the selection session ID "sel." In this way, the relay apparatuses 30*a* and 30*b* may determine that the pre-transmission information has been transmitted and the IP address "1.2.1.3" of the transmission terminal 10*aa* corresponding to the requesting terminal 10A during execution of the session identified by the selection session ID "sel."

Then, using the IP address "1.3.2.4" of the transmission terminal 10*db* included in the pre-relay request information received from the transmission management system 50 in steps 61-1 and S61-2, the relay apparatuses 30*a* and 30*b* transmits the pre-transmission information received from the transmission terminal 10*aa* to the IP address "1.3.2.4" of the transmission terminal 10*db* (S64-1 and S64-2). In this way, the transmission terminal 10*db* corresponding to the destination terminal 10B may be notified of the pre-transmission information and determine the IP address ("1.2.1.2" or "1.2.2.2") of the relay apparatuses 30*a* or 30*b* corresponding to the sender of the pre-transmission information during execution of the session identified by the selection session ID "sel."

Then, based on the pre-transmission information from the relay apparatuses 30*a* and 30*b*, the selection processing unit 16 of the transmission terminal 10*db* selects one of the relay apparatuses 30*a* or 30*b* that is to be used for transmitting (relaying) image data and sound data to and from the transmission terminals 10*aa* and 10*db* in the television conference (S65).

It is noted that in the present example, the transmission terminal 10*db* corresponding to the destination terminal 10B selects the relay apparatus 30*a* as the relay apparatus 30 to be used in the television conference between the transmission terminals 10*aa* and 10*db*. However, in other examples, the transmission terminal 10*db* may transmit time information indicating the time it took for the transmission terminal 10*db* to receive the pre-transmission information transmitted from the transmission terminal 10*aa* to the transmission management system 50 or the transmission terminal 10*aa* so that the transmission management system 50 or the transmission terminal 10*aa* may perform the relay apparatus selection process.

Then, the transmission/reception unit 11 of the transmission terminal 10*db* transmits selection information indicating that the relay apparatus 30*a* has been selected to the transmission management system 50 via the communication network 2 (S66). The selection information includes the selection session ID "sel" and the relay apparatus ID "111a" of the selected relay apparatus 30*a*. In this way, the transmission management system 50 may be notified of the selection of the relay apparatus 30*a* and determine the IP address "1.3.2.4" of the transmission terminal 10*db* corresponding to the sender of the selection information during execution of the session identified by the selection session ID "sel."

Then, the session management unit 57 of the transmission management system 50 stores the relay apparatus ID "111a" of the selected relay apparatus 30*a* in the relay apparatus ID field of the record for the selection session ID "sel" included in the session management table (see FIG. 13) of the session management DB 5005 (S67-1), and the transmission/reception unit 51 transmits the IP address "1.3.2.4" of the transmission terminal 10db corresponding to the destination terminal 10B to the transmission terminal 10aa corresponding to the requesting terminal 10A (S67-2). Then, the transmission/reception unit 51 of the transmission management system 50 transmits relay start request information indicating a request to start relaying operations to the relay apparatus 30a via the communication network 2 (S68). The relay start request information includes the IP addresses "1.2.1.3" and "1.3.2.4" of the transmission terminal 10aa corresponding to the requesting terminal 10A and the transmission terminal 10db corresponding to the destination terminal 10B. In turn, the relay apparatus 30a establishes a session for transmitting image data (low-resolution image data, medium-resolution image data, and/or high-resolution image data) and sound data to and from the transmission terminals 10aa and 10db (S69). In this way, the transmission terminals 10aa and 10db may start the television conference.

It is noted that in the above example, the transmission management system 50 transmits the relay apparatus restriction information to the transmission terminal 10db corresponding to the destination terminal 10B in step S47, and after steps S48-S64-1 and S64-2 are performed, the transmission terminal 10db performs the relay apparatus selection process in step S65. However, in other examples, the transmission management system 50 may transmit the relay apparatus restriction information to the transmission terminal 10aa corresponding to the requesting terminal 10A in step S47, in which case the roles of the transmission terminals 10aa and 10db as the sender and receiver of information are switched from the above example in the ensuing process steps up to steps S64-1 and S64-2. In this case, the transmission terminal 10aa may perform the relay apparatus selection process of step S65 instead of the transmission terminal 10db and transmit the selection information to the transmission management system 50 in step S66.

In the following, exemplary process steps for exchanging image data and sound data during the television conference between the transmission terminals 10aa and 10db are described with reference to FIGS. 5B and 24. First, the transmission/reception unit 11 of the transmission terminal 10aa corresponding to the requesting terminal 10A transmits image data of an imaging object captured by the imaging unit 14a and sound data of sound input to the sound input unit 15a to the relay apparatus 30a via the communication network (S81). In the present example, high-quality image data including image data of the low-resolution image, medium-resolution image, and the high-resolution image shown in FIGS. 7A-7C and sound data are transmitted to the relay apparatus 30a. In this way, the transmission/reception unit 31 of the relay apparatus 30a receives the image data in three different resolution levels and the sound data. Then, the data quality confirming unit 33 confirms the image quality of the image data to be transmitted by searching the quality change management table (see FIG. 8) using the IP address "1.3.2.4" of the transmission terminal 10db as a search key and extracting the corresponding image quality of image data to be transmitted (S82). In the present example, the data quality confirming unit 33 confirms that image data of "high quality" is to be transmitted which quality is the same as that of the image data received by the transmission/reception unit 33. Thus, the image data of the same quality and the sound data of the same quality as those received by the transmission/reception unit 33 are transmitted to the transmission terminal 10db (S83). In this way, the transmission/reception unit 11 of the transmission terminal 10db corresponding to the destination terminal 10B may receive the image data and sound data, the image display control unit 14b may display an image at the display 120 based on the image data, and the sound output unit 15b may output sound based on the sound data.

Then, the delay detecting unit 17 of the transmission terminal 10db detects the delay time of the image data reception by the transmission/reception unit 11 at intervals of a predetermined time period (e.g., every second) (S84). In the example described below, it is assumed that a delay time of 200 ms is detected by the delay time detecting unit 17.

The transmission/reception unit 11 of the transmission terminal 10db transmits delay information indicating the delay time of "200 ms" to the transmission management system 50 via the communication network 2 (S85). In this way, the transmission management system 50 may determine the image data reception delay time and the IP address "1.3.2.4" of the transmission terminal 10db corresponding to the sender of the delay information.

Then, the delay time management unit 60 of the transmission management system 50 searches the terminal management table (see FIG. 11) using the IP address "1.3.2.4" of the transmission terminal 10db as a search key to extract the terminal ID "01db" of the transmission terminal 10db and stores the delay time "200 ms" indicated by the delay information in the delay time field of the record for the extracted terminal ID "01db" included in the session management table (see FIG. 13) of the session management DB 5005 (S86).

Then, the quality determining unit 58 searches the quality management table (see FIG. 16) using the delay time "200 ms" as a search key to extract the corresponding image quality "medium quality," and determines the image quality of image data to be transmitted as "medium quality" (S87).

Then, the transmission/reception unit 51 searches the relay apparatus management table (see FIG. 9) using the relay apparatus ID "111a" associated with the terminal ID "01db" in the session management table (see FIG. 13) as a search key to extract the IP address "1.2.1.2" of the corresponding relay apparatus 30a (S88). Then, the transmission/reception unit 51 transmits quality information indicating "medium quality" as the image quality of image data to be transmitted as determined in step S87 to the relay apparatus 30a via the communication network 2 (S89). The quality information includes the IP address "1.3.2.4" of the transmission terminal 10db that was used as the search key in step S86. In turn, the quality change management unit 34 of the relay apparatus 30a stores the IP address "1.3.2.4" of the transmission terminal 10db corresponding to the transmission destination in association with the image quality "medium quality" of the image data to be transmitted (relayed) in the quality change management table (see FIG. 8) (S90).

Then, the transmission terminal 10aa transmits high quality image data (including image data of a high resolution image, a medium resolution image, and a low resolution image) and sound data to the relay apparatus 30a in a manner similar to step S81 (S91). In turn, the data quality confirming unit 33 of the relay apparatus 30a confirms the image quality of the image data to be transmitted by searching the quality change management table (see FIG. 8) using the IP address "1.3.2.4" of the transmission terminal 10db as a search key and extracting the corresponding image quality "medium quality" of image data to be transmitted in a manner similar to step S82 (S92). Since the quality management table has been updated by the quality change management unit 34 in step S90 to indicate "medium quality" as the corresponding image quality for the IP address "1.3.2.4" of the transmission terminal 10*db*, the data quality confirming unit 33 confirms that image data of "medium quality" is to be transmitted, which quality is lower than the high quality image data received by the transmission/reception unit 31. Thus, the data quality change unit 35 changes the quality of the image data to be transmitted by degrading the quality from "high quality" to "medium quality" (S93). Then, the transmission/reception unit 31 transmits the image data that has been changed from "high quality" to "medium quality" and sound data that is left unchanged to the transmission terminal 10*db* via the communication network 2 (S94). As can be appreciated from above, in the present example, when a delay occurs in the reception of image data at the transmission terminal 10*da*, the relay apparatus 30*a* changes the image quality of the image data to be transmitted so that awkwardness would not be felt by the participants of the television conference.

Other Embodiments

In one embodiment, a mirror driver may be used to perform a process of obtaining display data. The mirror driver enables direct transmission of display data to a USB driver without running a program. In such an embodiment, the mirror driver generates the display data and the USB driver transmits the generated display data to the transmission terminal 10 via the external device connection I/F 118. In this case, a program for obtaining the display data may not be necessary so that resources for running a program may be conserved, for example.

It is noted that in the example described above, a program for obtaining image data generated by a display driver and transmitting the generated image data to the transmission terminal 10 is used. However, in another embodiment, a program for obtaining a drawing command generated by a GDI (Graphics Design Interface) and transmitting the drawing command to the transmission terminal 10 may be used. In such an embodiment, network resources may be conserved since the data volume of a drawing command is smaller than that of image data.

It is also noted that the transmission management system 50, the program providing system 90, and the maintenance system 100 may be realized by a single computer, or the functional units of the above systems may be divided and allocated to multiple computers. In a case where the program providing system 90 is realized by a single computer, a program transmitted by the program providing system 90 may be divided into plural modules, or the program may be transmitted as a whole without being divided. In a case where the program providing system 90 is realized by multiple computers, the program may be divided into plural modules and transmitted by the computers realizing the program providing system 90.

It is also noted that the recording medium storing the transmission terminal program, the relay apparatus program, and the transmission management program; the HD 204 storing the above programs; and the program providing system 90 including the HD 204 may embody computer program products that are used to provide the transmission terminal program, the relay apparatus program, and/or the transmission management program to users both within and outside the country, for example.

It is also noted that in the example, described above, the quality change management table shown in FIG. 8 and the quality management table shown in FIG. 16 are configured to manage the image resolution of the image data to be transmitted by the relay apparatus 30. However, the present invention is not limited to such an example, and in other examples, the data quality management may be based on other data properties such as the image depth of image data, the sampling frequency of sound data, and/or the bit length of sound data, for example.

Also, although the relay apparatus management table shown in FIG. 9, the terminal management table shown in FIG. 11, and the session management table shown in FIG. 13 are configured to manage the received time/date in the example described above, the present invention is not limited to such an example and in other examples, only the received time may be stored and managed.

Further, although the relay apparatus management table shown in FIG. 9 is configured to manage the IP addresses of the relay apparatuses 30 and the terminal management table shown in FIG. 11 is configured to manage the IP addresses of the transmission terminals 10 in the example described above, the present invention is not limited to such an example so long as relay apparatus specific information for identifying the relay apparatus 30 on the communication network 2 and terminal specific information for identifying the transmission terminal on the communication network 2 are managed. For example, the FQDN (Fully Qualified Domain Name) of each of the relay apparatuses 30 and the transmission terminals 10 may be managed instead of the IP address. In this case, an IP address corresponding to a FQDN may be obtained by a conventional DNS (Domain Name System) server. It is noted that the "relay apparatus specific information for identifying the relay apparatus 30 on the communication network 2" described above may alternatively be referred to as "relay apparatus connection information indicating the connection destination of the relay apparatus 30 on the communication network 2" or "relay apparatus destination information indicating the destination of the relay apparatus 30 on the communication network 2," for example. Similarly, the terminal specific information for identifying the transmission terminal on the communication network 2" described above may alternatively be referred to as "terminal connection information indicating the connection destination of the transmission terminal 10 on the communication network 2" or "terminal destination information indicating the destination of the transmission terminal 10 on the communication network 2," for example.

It is also noted that although a television conference system is described as an exemplary embodiment of the transmission system 1, the present invention is not limited to such an example. In other embodiments, the transmission system 1 may be a phone system such as an IP (Internet Protocol) phone system or an Internet phone system, for example. In yet another embodiment, the transmission system 1 may be a car navigation system. In this case, at least one of the relay apparatuses 30 may be a car navigation device installed in a vehicle, and another one of the relay apparatuses 30 may be a management terminal or a management server of a management center that manages car navigation, for example.

Further, the present invention is not limited to these embodiments, and numerous variations and modifications may be made without departing from the scope of the present invention.

The present application is based on and claims the benefit of the priority date of Japanese Patent Application No. 2011-281948 filed on Dec. 22, 2011 with the Japanese Patent Office, the entire contents of which are hereby incorporated by reference.

The invention claimed is:

1. An electronic device that requires setup of plural setting items upon initial startup operations, the electronic device comprising:

a memory that stores designated setting information and a setting status value indicating whether the setting items have been set up, the setting status value indicating a status of all of the setting items, and the designated setting information and the setting status value being stored and updated each time a setup of one of the setting items is completed; and circuitry configured to refer to the memory upon performing the initial startup operations to determine whether at least one of the setting items has been set up, and start setup operations for other setting items that have not yet been set up, wherein the setting items include a language setting for selecting a language to be used in a user interface, a format/time zone setting for selecting a format/time zone corresponding to a region in which the electronic device is situated, and a network setting for setting up network information of the electronic device, a first setting value indicates that none of the language setting, the format/time zone setting, and the network setting have been completed, a second setting value indicates that the language setting has been completed, but the format/time zone setting and the network setting have not been completed, a third setting value indicates that the language setting and the format/time zone setting have been completed, but the network setting has not been completed, and a fourth setting value indicates that the language setting, the format/time zone setting, and the network setting have been completed.

2. The electronic device as claimed in claim 1, wherein the circuitry is configured to:

obtain user interface information based on the designated setting information of the language setting, and display, on a display, the user interface based on the obtained user interface information.

3. The electronic device as claimed in claim 2, wherein the circuitry is configured to:

transmit a login request and language information stored in the memory as the designated setting information of the language setting to a management system, and if the login request is accepted, receive user interface resource information from the management system, transmit a user interface information request to a user interface providing system based on the received user interface resource information, and receive the user interface information from the user interface providing system.

4. The electronic device as claimed in claim 1, further comprising:

a transmission terminal that transmits and receives data to be shared with another transmission terminal and outputs image data to a display device.

5. An electronic device control program product comprising a non-transitory computer-readable medium having a computer program recorded thereon that is executable by a computer comprising an electronic device that requires setup of plural setting items upon initial startup operations, the computer program when executed causing the computer to perform the steps of:

storing designated setting information and a setting status value indicating whether the setting items have been set up in a memory, the setting status value indicating a status of all of the setting items, and the designated setting information and the setting status value being stored and updated each time a setup of one of the setting items is completed; and referring to the memory upon performing the initial startup operations to determine whether at least one of the setting items has been set up, and starting setup operations for other setting items that have not yet been set up, wherein the setting items include a language setting for selecting a language to be used in a user interface, a format/time zone setting for selecting a format/time zone corresponding to a region in which the electronic device is situated, and a network setting for setting up network information of the electronic device, a first setting value indicates that none of the language setting, the format/time zone setting, and the network setting have been completed, a second setting value indicates that the language setting has been completed, but the format/time zone setting and the network setting have not been completed, a third setting value indicates that the language setting and the format/time zone setting have been completed, but the network setting has not been completed, and a fourth setting value indicates that the language setting, the format/time zone setting, and the network setting have been completed.

6. The electronic device as claimed in claim 1, wherein the circuitry is configured to start setup operations for the language setting, the format/time zone setting, and the network setting when the first setting value is stored in the memory, the circuitry is configured to start setup operations for the format/time zone setting and the network setting when the second setting value is stored in the memory, and the circuitry is configured to start setup operations for the network setting when the third setting value is stored in the memory.

* * * * *